United States Patent [19]

Skelskey

[11] 4,403,916
[45] Sep. 13, 1983

[54] WIND TURBINES

[75] Inventor: David A. Skelskey, Chicago, Ill.

[73] Assignee: Chicago Province of the Society of Jesus, Chicago, Ill.

[21] Appl. No.: 183,077

[22] Filed: Sep. 2, 1980

[51] Int. Cl.³ .............................................. F03D 7/04
[52] U.S. Cl. ........................................ 416/14; 416/37
[58] Field of Search ..................................... 416/12–14, 416/1, 37, DIG. 4, DIG. 6

[56] References Cited

U.S. PATENT DOCUMENTS

| | | | |
|---|---|---|---|
| 766,219 | 8/1904 | Clemson | 416/9 X |
| 1,816,632 | 7/1931 | Bucklen | 416/14 X |
| 1,930,390 | 10/1933 | Jacobs | 416/13 X |
| 2,103,910 | 12/1937 | Lung | 416/14 |
| 2,158,606 | 5/1939 | Wigzell | 416/14 |
| 2,207,964 | 7/1940 | Albers | 416/13 |
| 2,303,441 | 12/1942 | Donlon | 416/13 |
| 3,667,861 | 6/1972 | Parish | 416/14 |
| 4,088,420 | 5/1978 | Jacobs et al. | 416/170 A X |
| 4,297,075 | 10/1981 | Jacobs et al. | 416/140 R X |
| 4,298,313 | 11/1981 | Hohenemser | 416/98 |

FOREIGN PATENT DOCUMENTS

| | | | |
|---|---|---|---|
| 98876 | 11/1923 | Austria | 416/132 B |
| 636869 | 4/1928 | France | 416/132 B |
| 209552 | 1/1924 | United Kingdom | 416/170 A |
| 227051 | 1/1925 | United Kingdom | 416/13 |

Primary Examiner—Everette A. Powell, Jr.
Attorney, Agent, or Firm—FitzGibbon, Roehrig, Greenawalt & Stone

[57] ABSTRACT

A wind turbine having a generally vertically extending support tower upon which are mounted a front or blade section and a rear or tail section. The front section includes a generally horizontal drive shaft which is connected to a vertical drive shaft in the support tower. The rear or tail section is rotatably mounted on the support structure to permit radial oscillation of the tail section. The blade and tail section are releasably interconnected to each other such that upon manual operation of a latch, the rear or tail section can pivot independently from the front or blade section. The front section is upwardly inclined relative to the rear section whereby a universal joint is provided in the vertical drive shaft to insure that a portion of the vertical drive shaft remains perpendicular to the horizontal drive shaft connected to the front or blade section.

38 Claims, 33 Drawing Figures

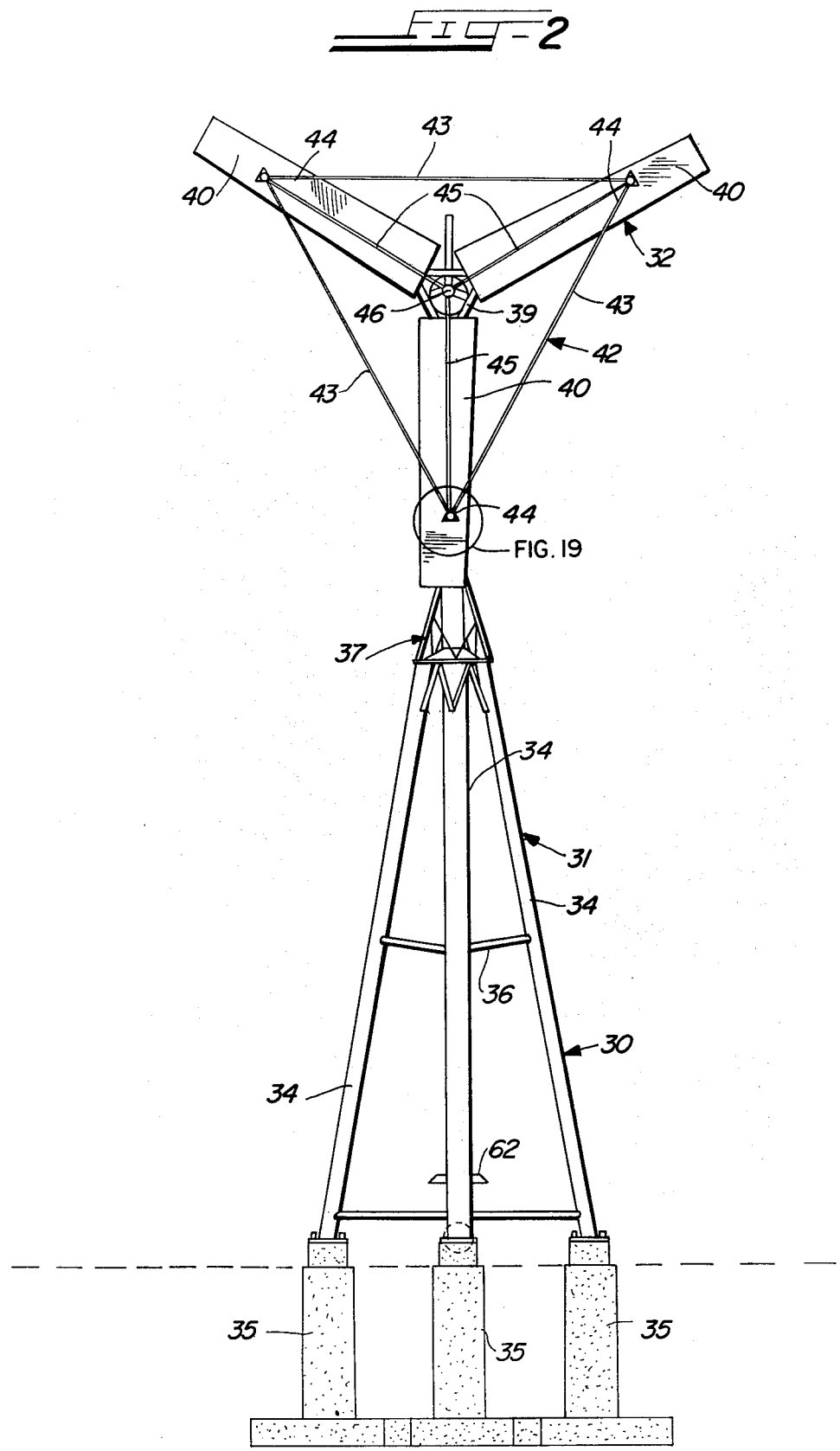

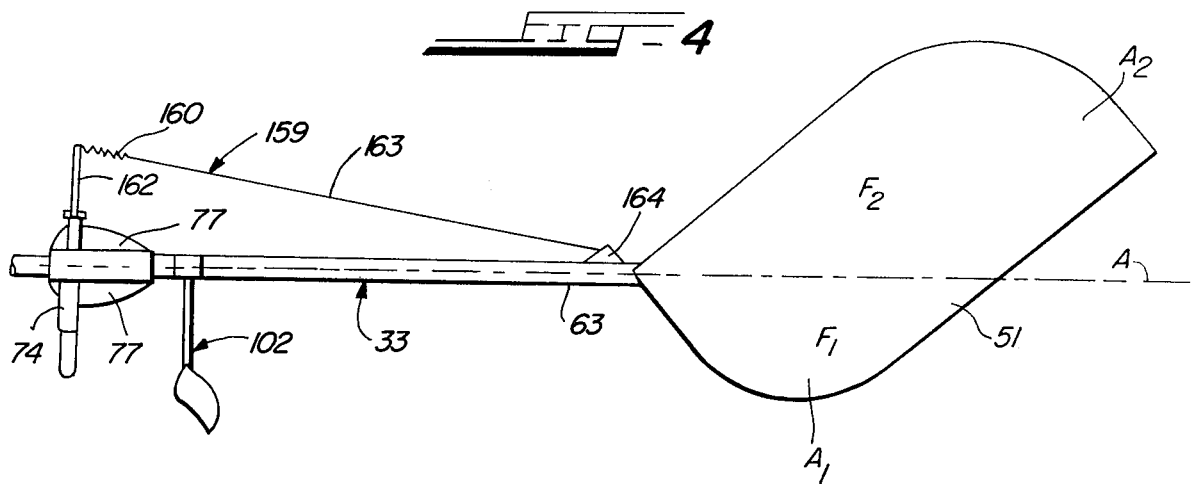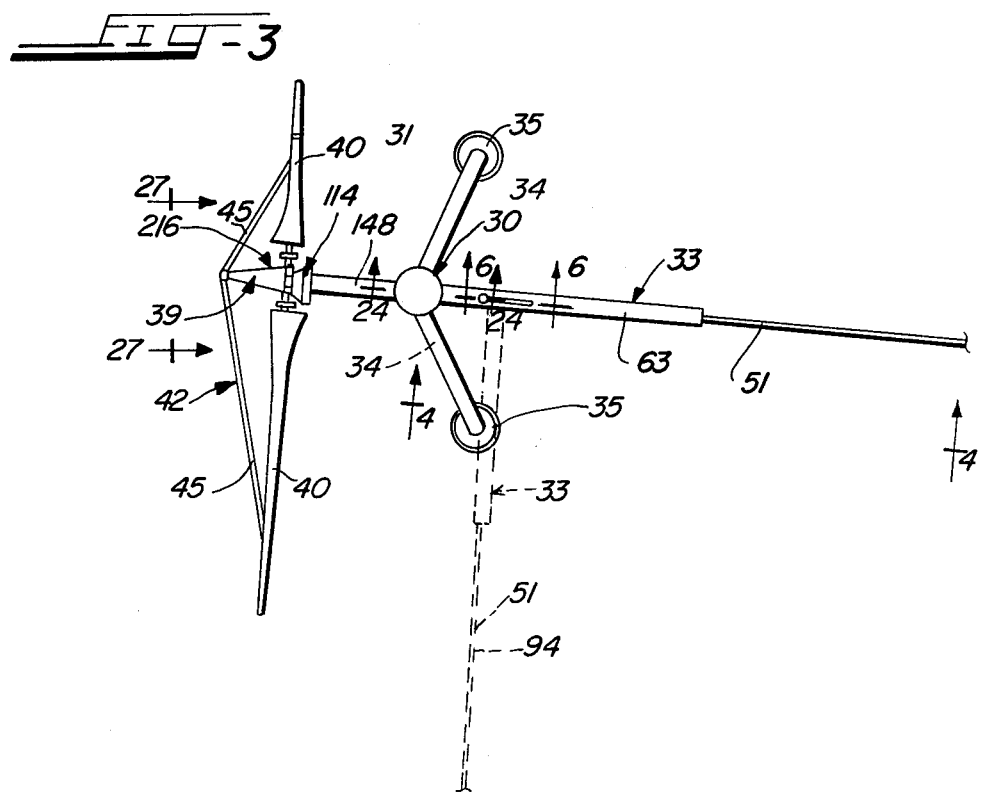

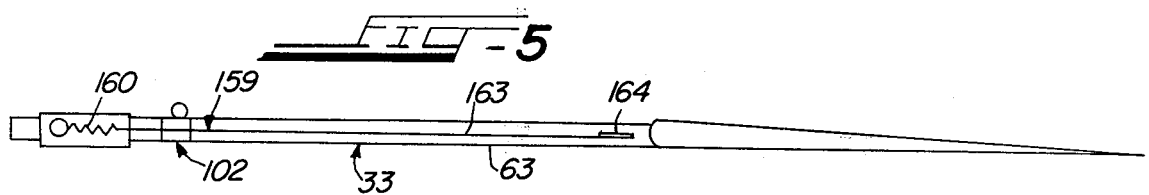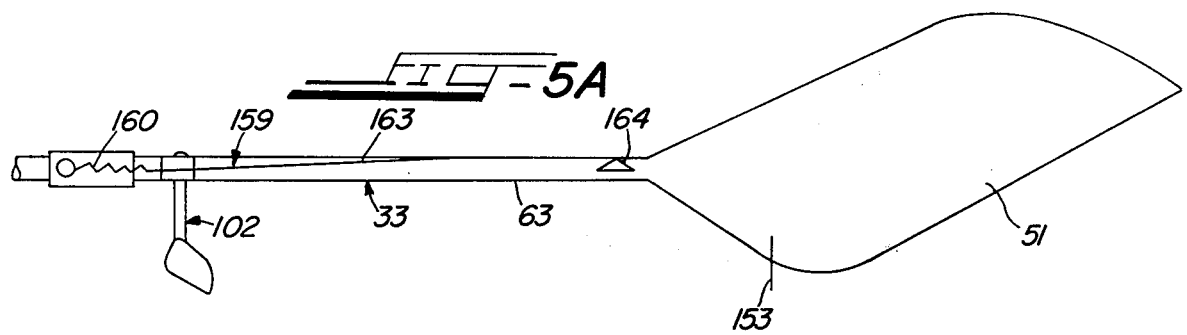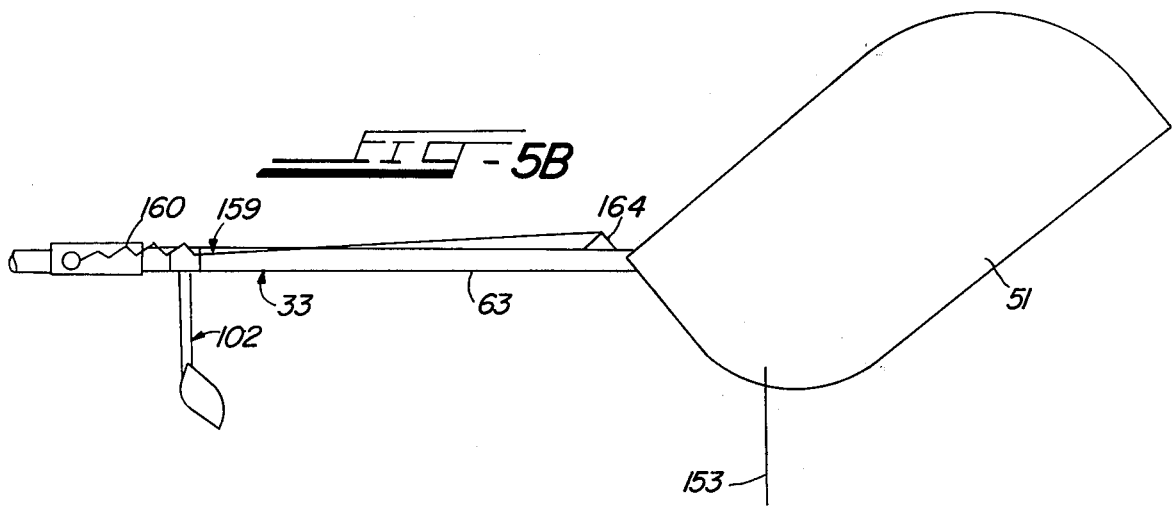

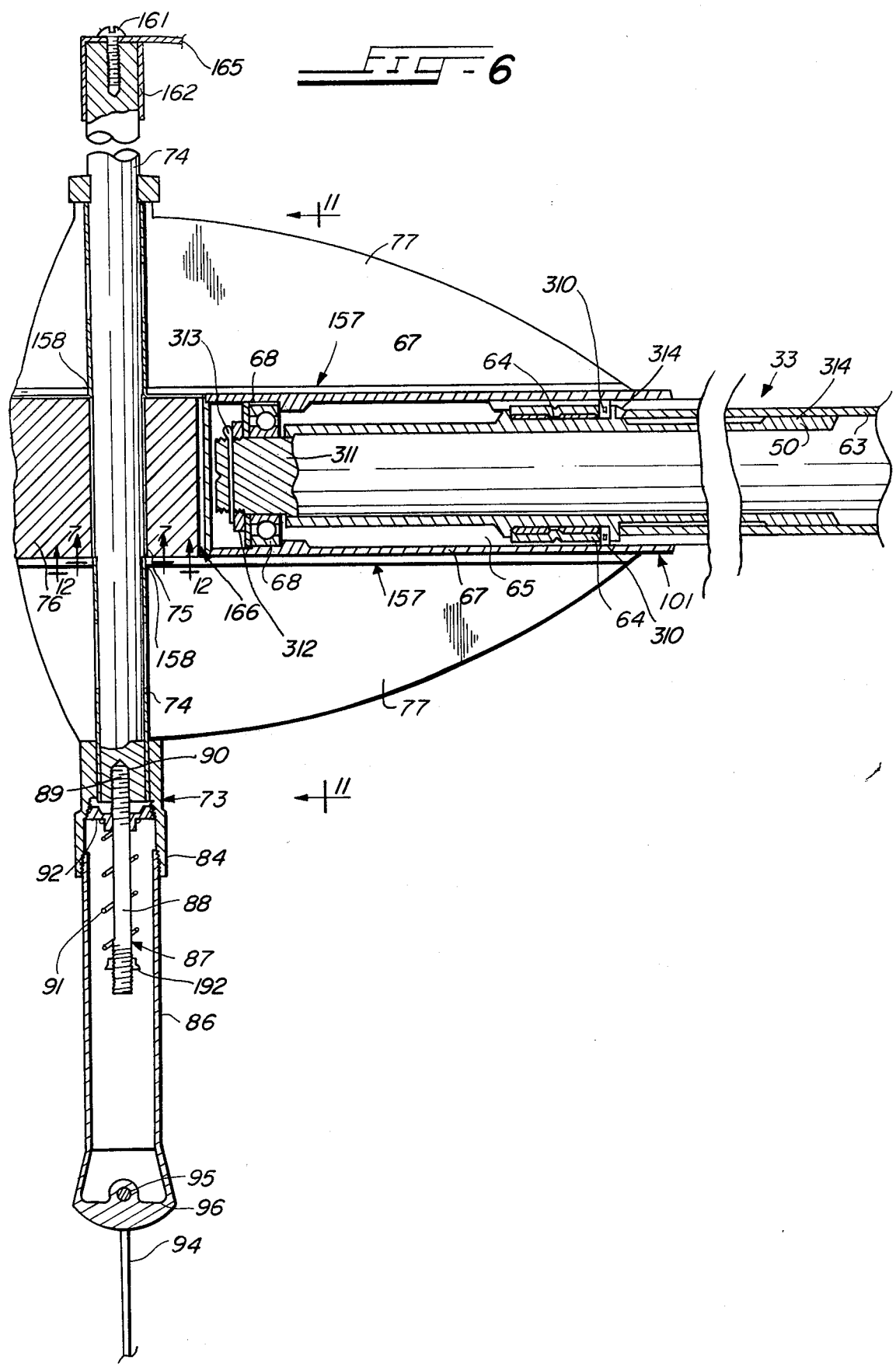

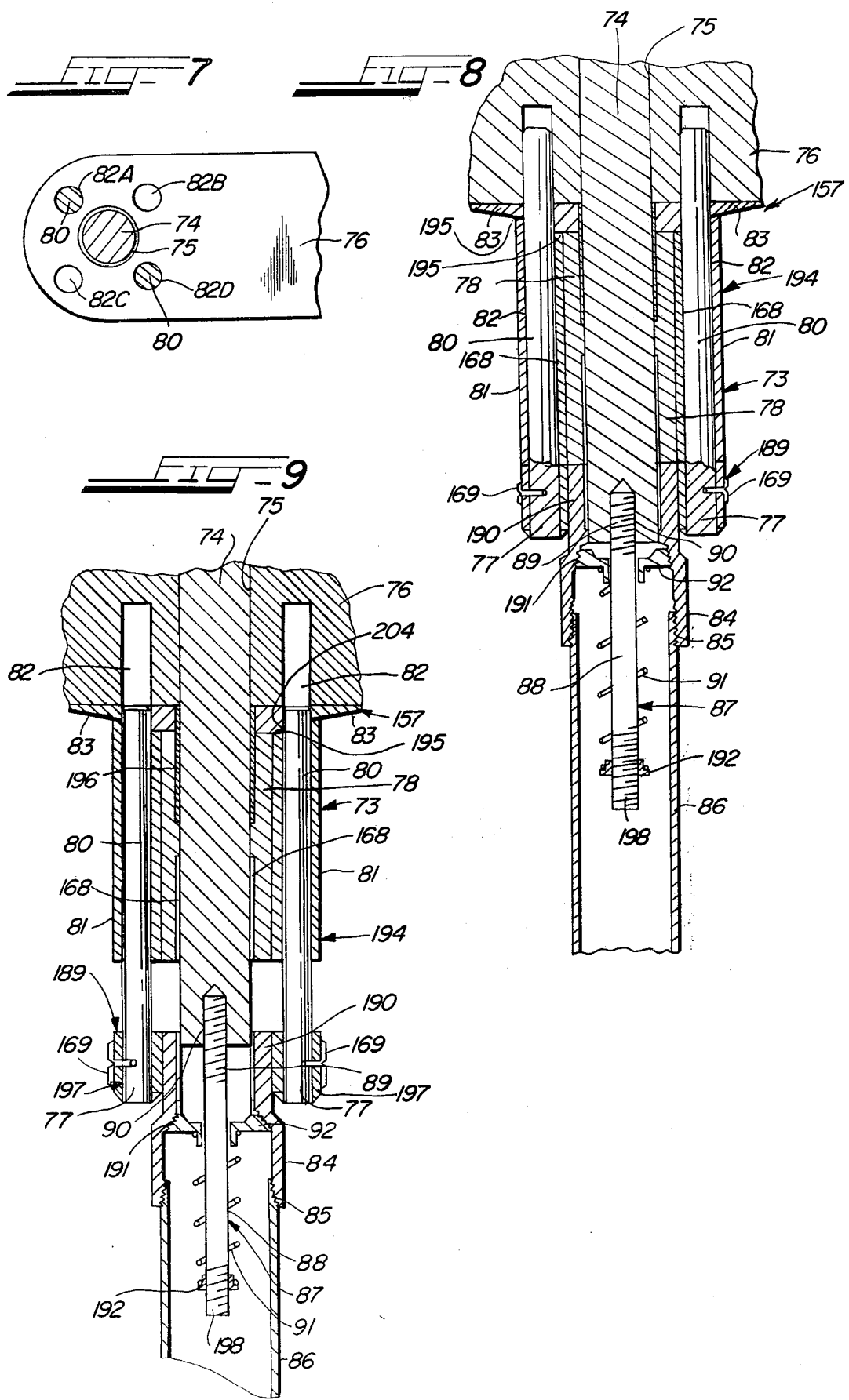

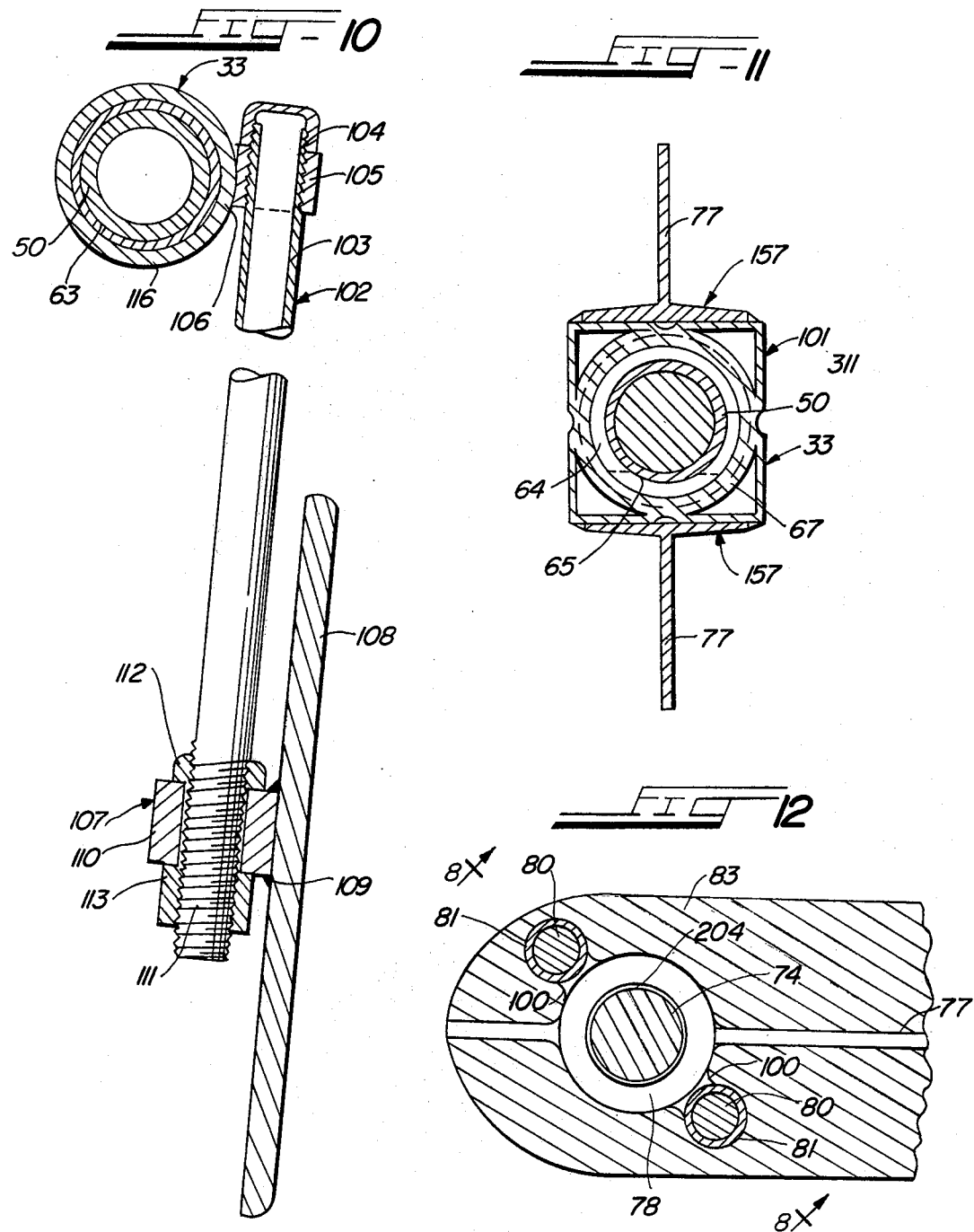

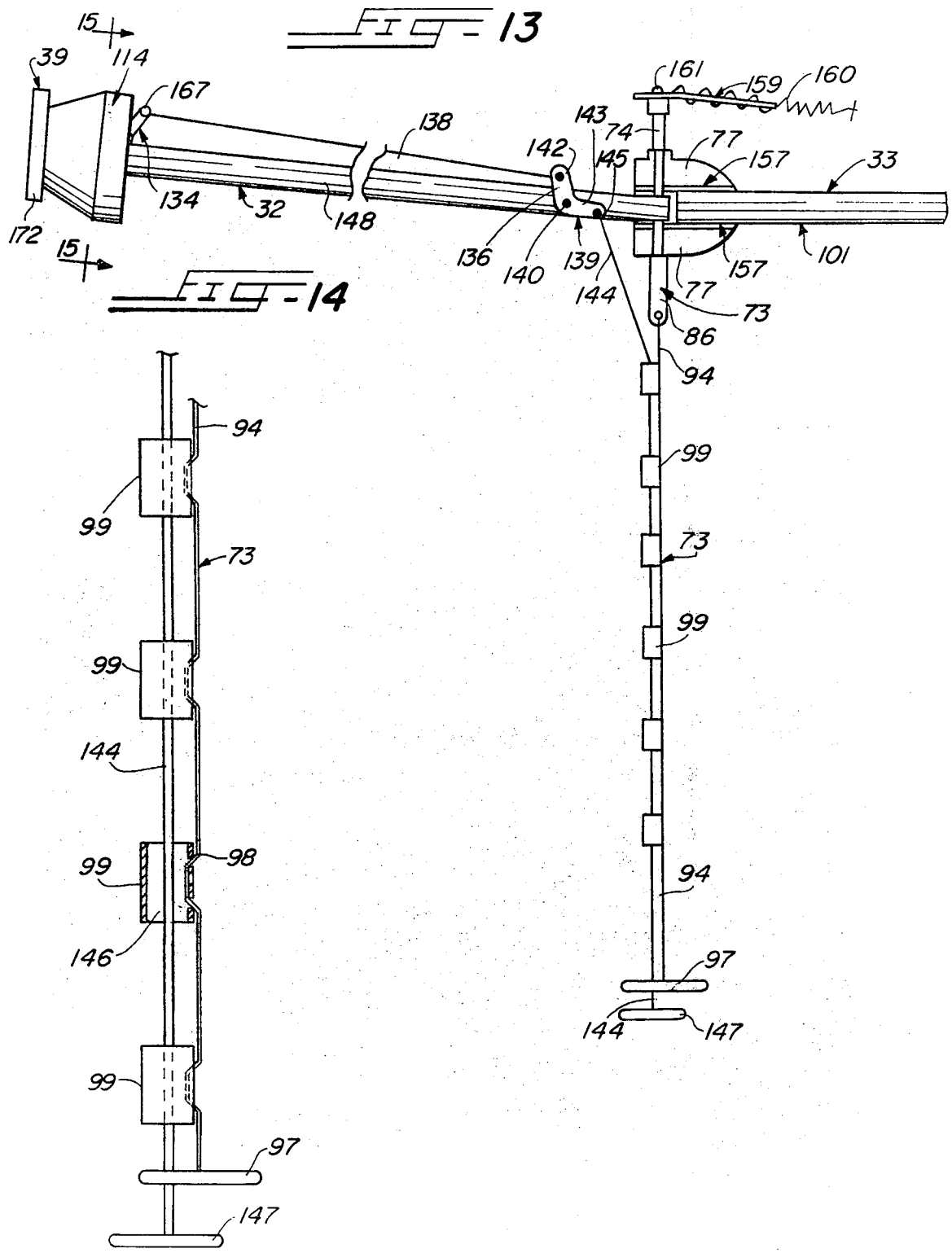

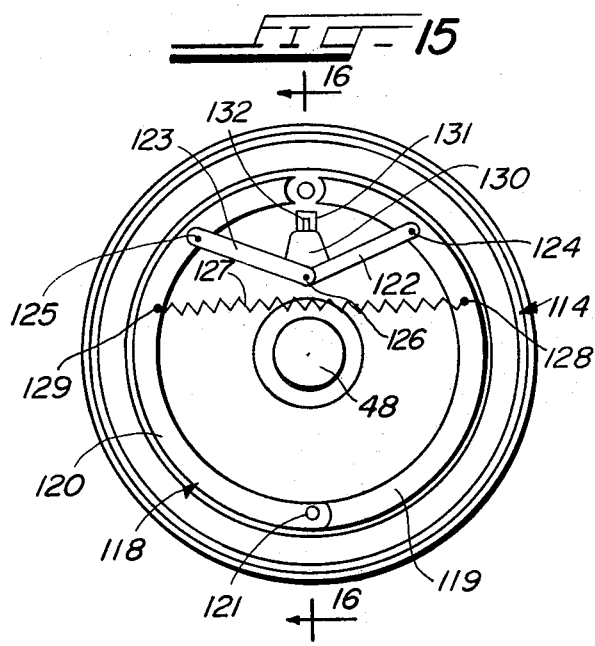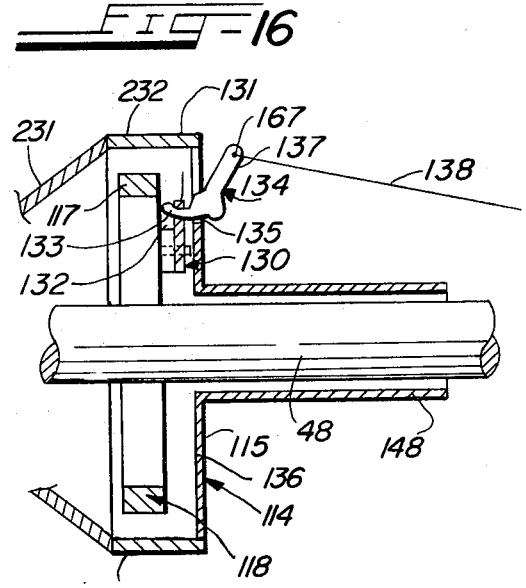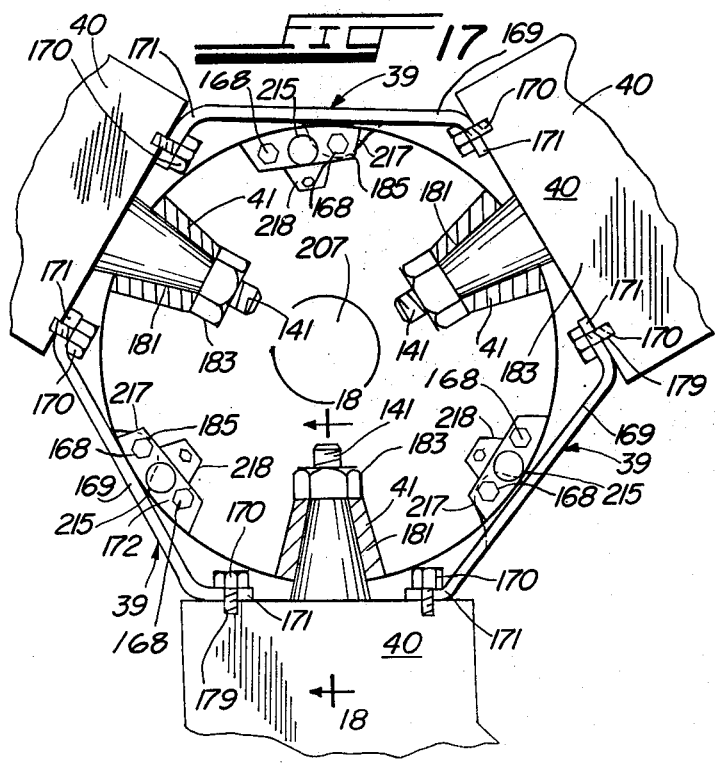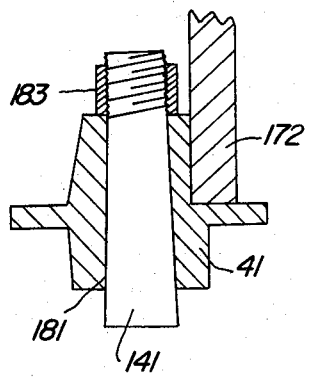

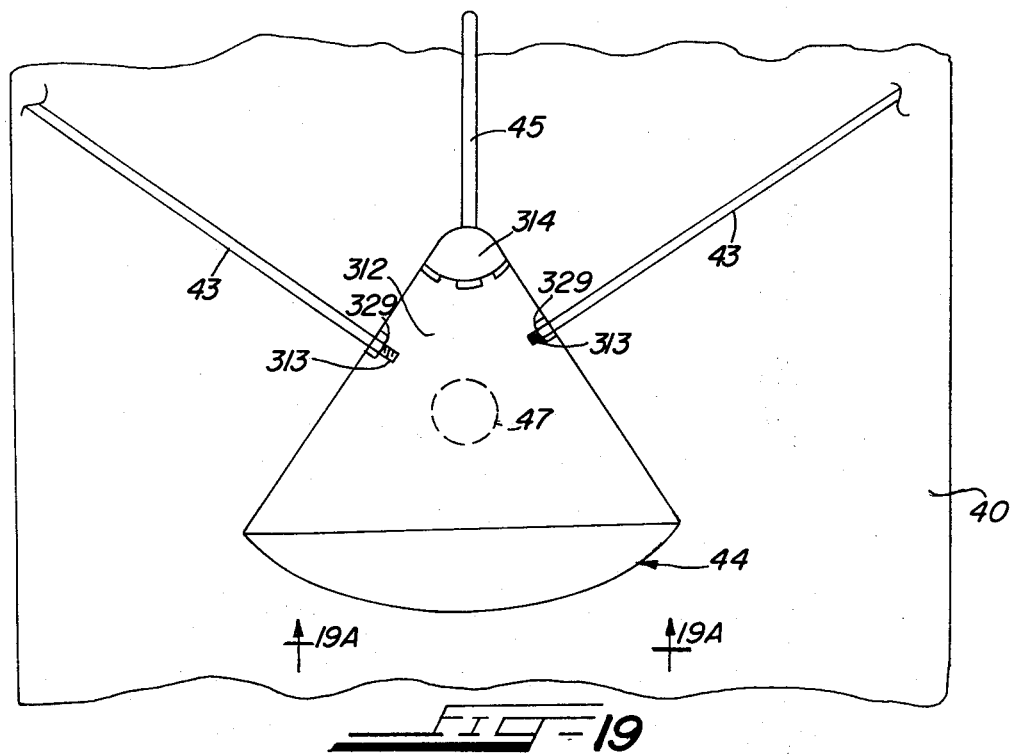
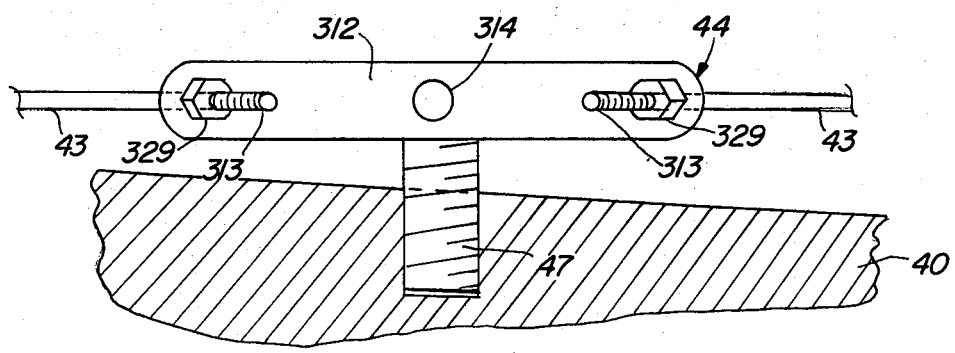

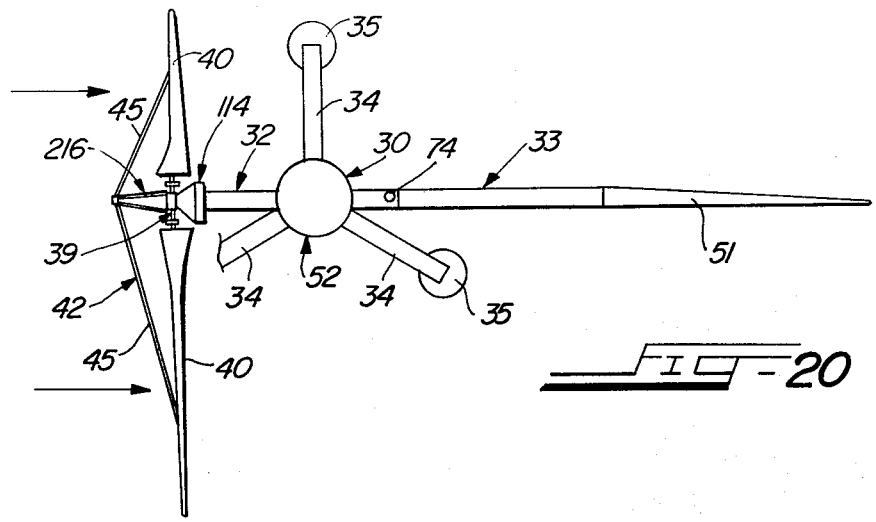
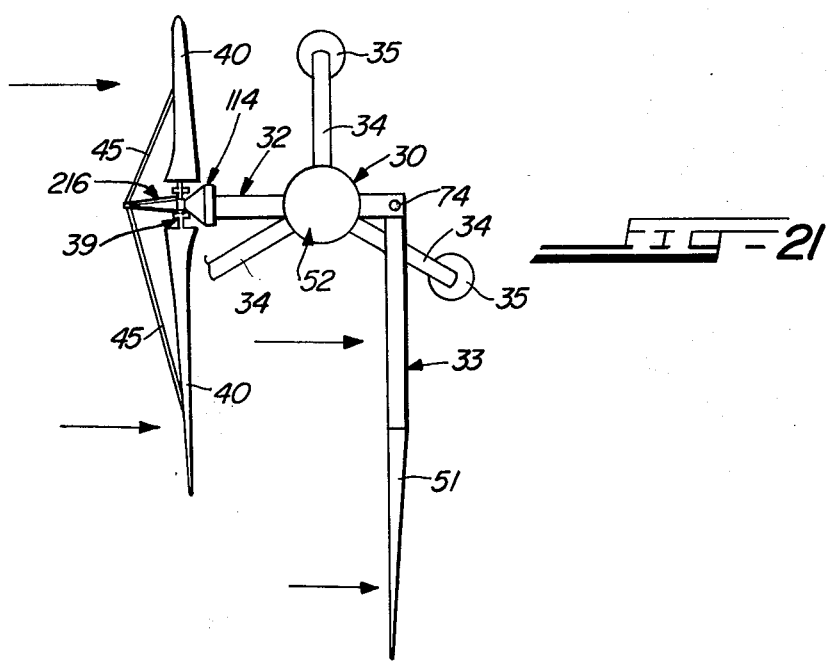
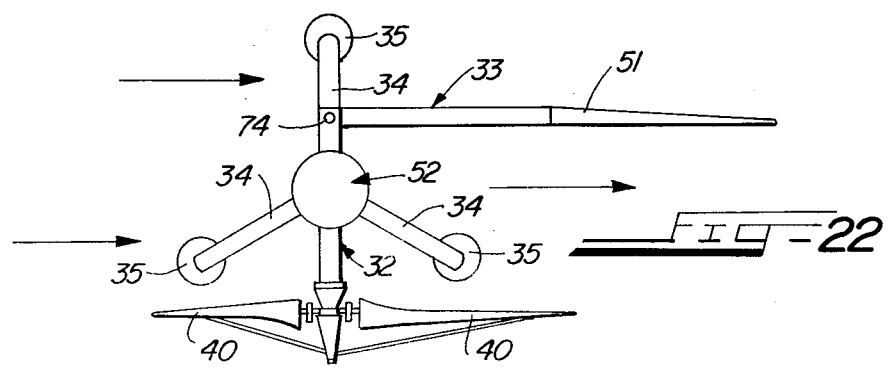

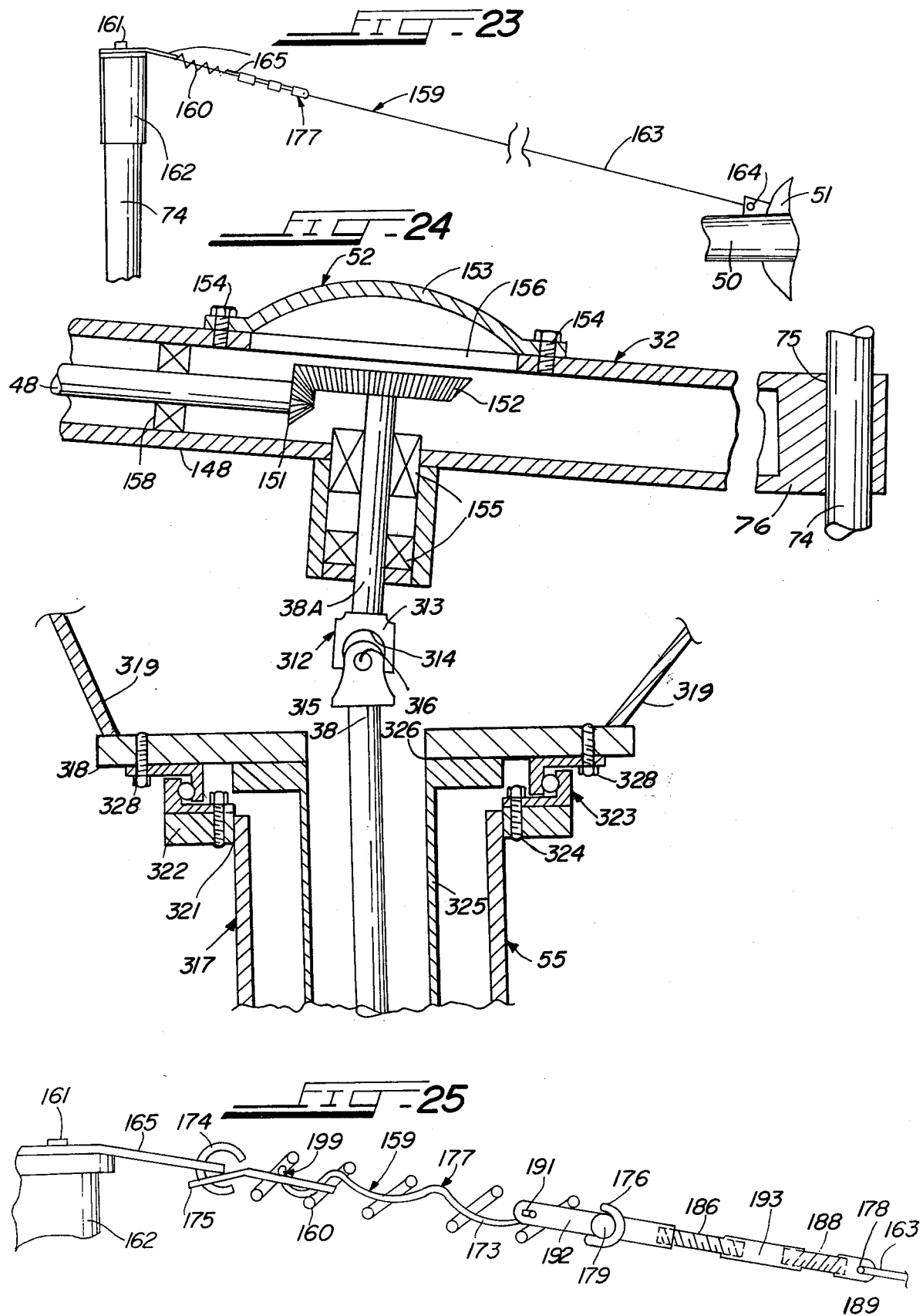

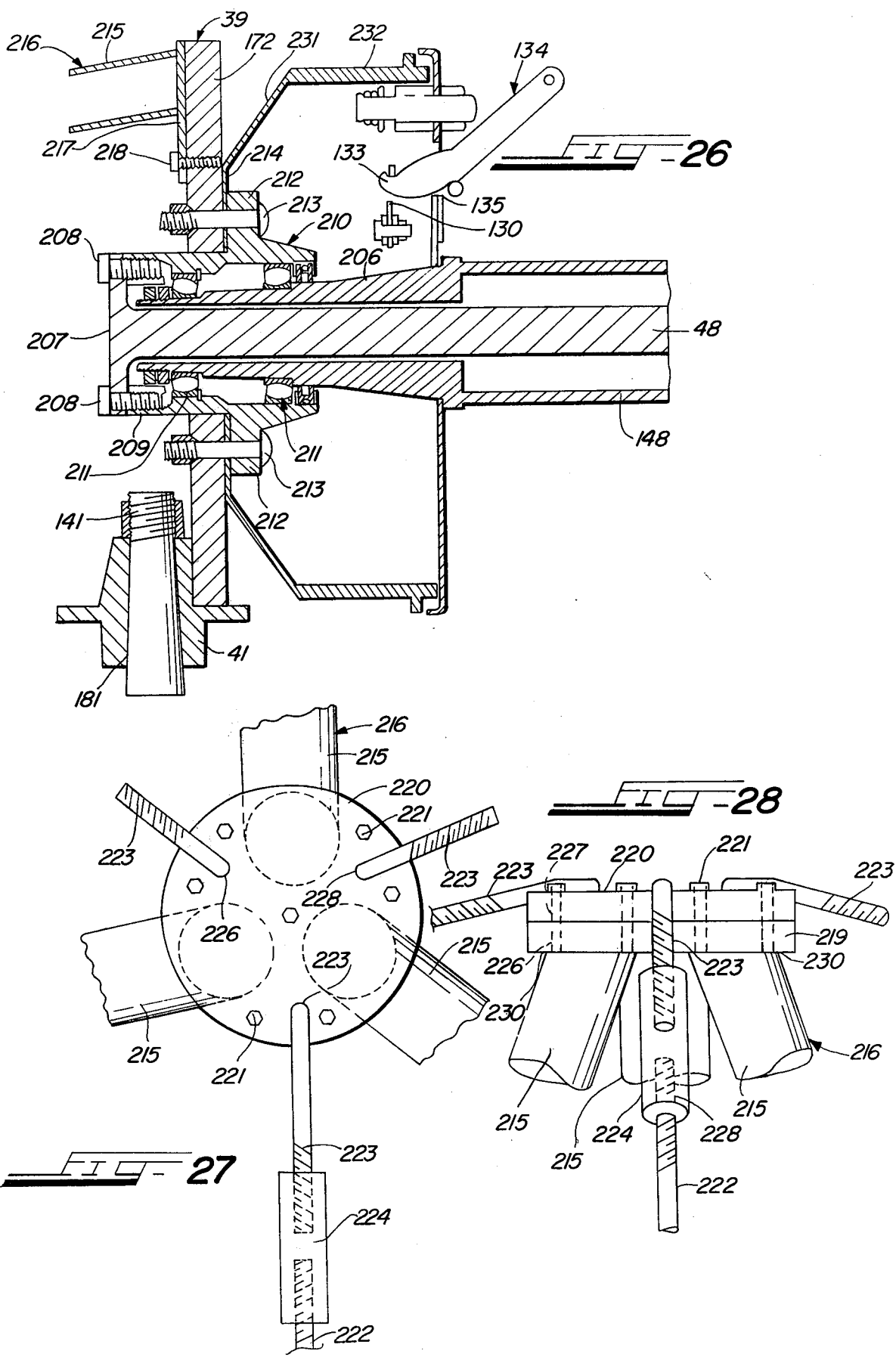

WIND TURBINES

BACKGROUND OF THE INVENTION

Wind turbines, sometimes called windmills, of various types and constructions have been known and used heretofore. Thus, the prior art is represented by U.S. Pat. Nos. 1,408,905 granted Mar. 7, 1922 to Lorain A. Pearson on a Windmills; 2,360,791 granted Oct. 17, 1944 to Palmer Cosslett Putnam on a Wind Turbine; 2,363,827 granted Nov. 28, 1944 to John R. Albers on a Dually Pivoted Wind Driven Power Plant; 3,271,005 granted Sept. 6, 1966 to George R. Jones on a Mechanical Overspeed Prevention Device; 3,667,861 granted June 6, 1972 to Albert A. Parish on a Wind Vane Controlling Direction and Brake Means; and 3,891,347 granted June 24, 1975 to Marcellus L. Jacobs and Paul R. Jacobs on a Clutch Controlled, Wind Operated, Power Producing Propeller.

OBJECTS OF THE INVENTION

An object of the present invention is to provide a new and improved wind turbine which may be used to generate electrical power for operating water well pumps; air compressors; fluid agitators; machines, including threshing and other farm machinery; electrical generator-apparatus for generating electrical power for various uses and purposes, such as electrical illumination; for operating various electric power-driven apparatus or machinery; and for other purposes.

A further object of the invention is to provide in the new wind turbine a novel oscillating tail structure and a tail or tail fin member embodied therein.

Another object of the invention is to provide in the new wind turbine a novel means and construction for enabling the rear tail-supporting shaft and the tail or tail fin member mounted thereon to oscillate or have limited axial rotational movement on and relative to the longitudinal horizontal axis of the tail-supporting shaft, under the force of wind applied to the tail or tail fin member, while also enabling the entire rear or tail section of the new wind turbine, including the rear tail-supporting shaft and the tail or tail fin member mounted thereon, and the front or blade section of the wind turbine, to be pivoted in a generally horizontal plane relative to each other.

Another object of the invention is to provide in the new wind turbine novel manually controlled combination pivotal mounting and manually operable latch-operating means for pivotally mounting the front or blade section and the rear or tail section of the new wind turbine for pivotal movement in a generally horizontal plane so that in the event that a wind of unusually high velocity strikes the blades in the front or blade section of the new wind turbine the front or blade section and the rear or tail section may be manually unlatched from each other and pivoted on the combination pivotal mounting and latch-operating means and turned through an angle of ninety degrees (90°) from their normal operating positions so that the wind will strike the marginal or peripheral edges and not the faces of the blades, and hence the blades and other parts of the new wind turbine will not overspeed or will shut down and will not be damaged as might happen under the force of a wind of unusually high velocity.

A further object of the invention is to provide in the new wind turbine novel manually operable braking means for braking the rotation of the blade-driven power shaft which is embodied in the front or blade section of the new wind turbine and the blade members which drive the power shaft.

A further object of the invention is to provide in the new wind turbine a novel manually controlled pull pin unlatching means for unlatching the front or blade section and the rear or tail section from latching engagement with each other so that the rear or tail section may be manually pivoted on the combination pivotal mounting and latch-operating means in a generally horizontal plane relative to the front or blade section of the new wind turbine.

A further object of the invention is to provide therein novel interconnecting hinge means which forms a part of the latching means for releasably latching together the front or blade section and the rear or tail section of the new wind turbine.

Another object of the invention is to provide in the new wind turbine novel manually operable operating means for operating the aforesaid braking means including a manually operable flexible member which is manually accessible, by means of a hooked pole or rod, or the like, from the ground level on which the new wind turbine is mounted.

An additional object of the invention is to provide therein a novel manually controlled latch-operating means for controlling the latching means which releasably latches the front or blade section and the rear or tail section together including a manually operable flexible member which is manually accessible, by means of a hooked pole or rod, or the like, from the ground level on which the new wind turbine is mounted.

A further object of the invention is to provide therein novel manually operated means for pivoting the rear or tail section in a generally horizontal plane on the combination pivotal mounting and latch-operating means on which the front or blade section and the rear or tail section are pivotally mounted, for movement in a generally horizontal plane relative to each other including a manually operable flexible member which is manually accessible, by means of a hooked pole or rod, or the like, from the ground level on which the new wind turbine is mounted.

A further object of the invention is to provide therein novel wire cable reinforcing means for reinforcing the wind-driven blade members which are embodied in the new wind-driven turbine, and to balance the blade structure and to strengthen the blades against gravitational pull and to hold the blades against wind forces, and novel means for mounting the said wire cable reinforcing means.

An additional object of the invention is to provide in the new wind turbine novel resilient restraining means for restraining the oscillating or axial rotational motion of the rear or tail section and the tail or tail fin member embodied therein on and relative to the longitudinal axis of the tail-supporting shaft.

Still another object of the invention is to provide therein novel manually operable tension adjusting means for adjusting and varying the tension of the restraining means for controlling the oscillating limited rotational movement of the tail or tail fin member on or about the horizontal axis of the tail-supporting shaft.

A further object of the invention is to provide in the new wind turbine a novel tail or tail fin member embodying a novel airfoil design and which will oscillate or have limited axial rotational movement on and relative to the longitudinal axis of the tail-supporting shaft while, at the same time, being free to be pivoted in a generally horizontal plane on the combination pivotal mounting and latch-operating means.

An additional object of the invention is to provide therein a novel counterweight device for restraining, damping and controlling the oscillating or axial rotational movement of the rear or tail section of the new wind turbine on the combination pivotal mounting and latch-operating means.

An additional object of the invention is to provide in the new wind turbine novel means for effecting improved blade rotation in very weak winds by means of a torque converter in the form of a torque-multiplying fluid transmission clutch in the power transmission drive train of the new wind turbine and which also softens sudden changes in the loads on the output driveshaft and thus protects the blades from severe shear stresses.

An additional object of the invention is to provide in the new wind turbine novel means including a novel yaw bearing structure for orientation of the blade members into the wind for power and out of the wind for safety.

A further object of the invention is to provide in the new wind turbine a novel construction and arrangement of parts for pointing the blade structure into more favorable winds, which is upwind, and to compensate for conditions which occur when the blades are at a relatively low level, rather than at a high level, such as 75 or 100 feet, or higher.

Other objects will appear hereinafter.

DESCRIPTION OF FIGURES IN THE DRAWINGS

FIG. 2 is a front elevational view of the wind turbine shown in FIG. 1;

FIG. 3 is a top plan view of the new wind turbine shown in FIGS. 1 and 2;

FIG. 4 is a side elevational view, on line 4—4 in FIG. 3, illustrating the tail section of the new wind turbine in its normal operating position;

FIG. 5 is a top plan view of the rear or tail section of the new wind turbine shown in FIGS. 1, 2, 3 and 4 and illustrating the tail or tail fin member in its normal operating position;

Figure 1:
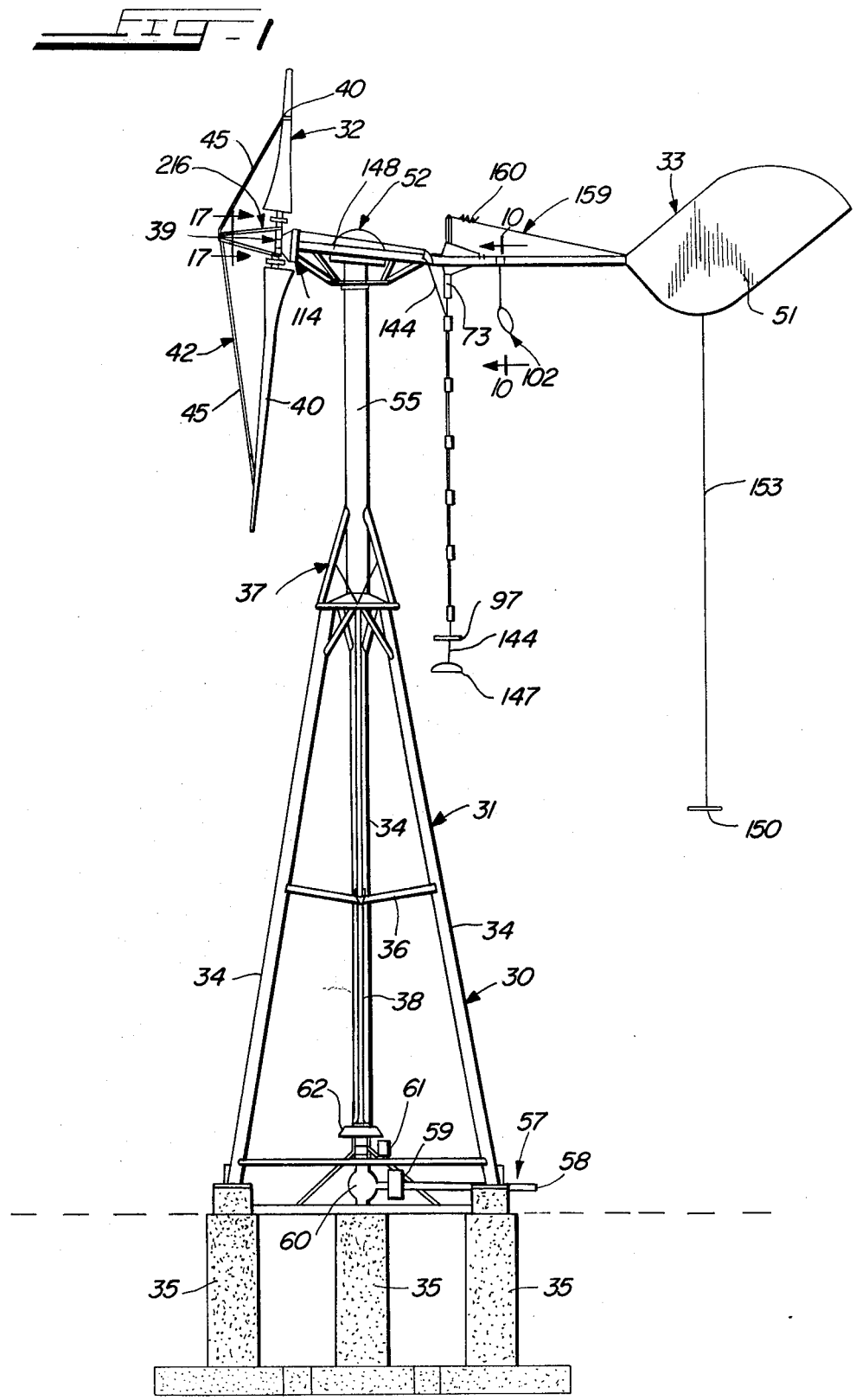
FIG. 1 is a side elevational view of a wind turbine embodying the present invention.
Figure 29:
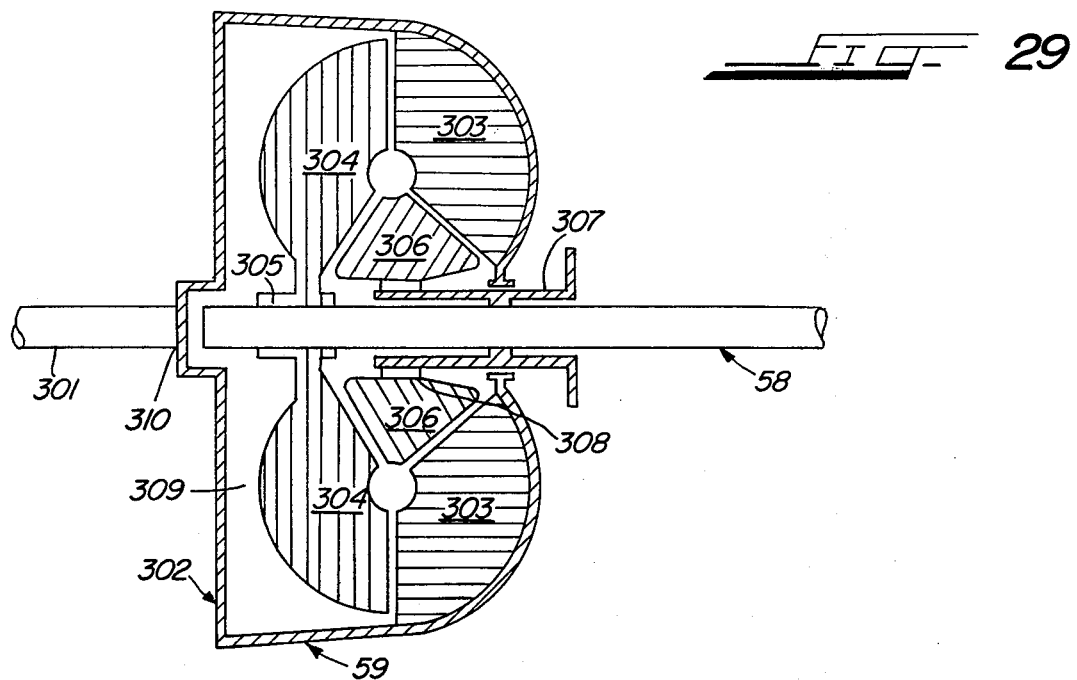
Figure 30:
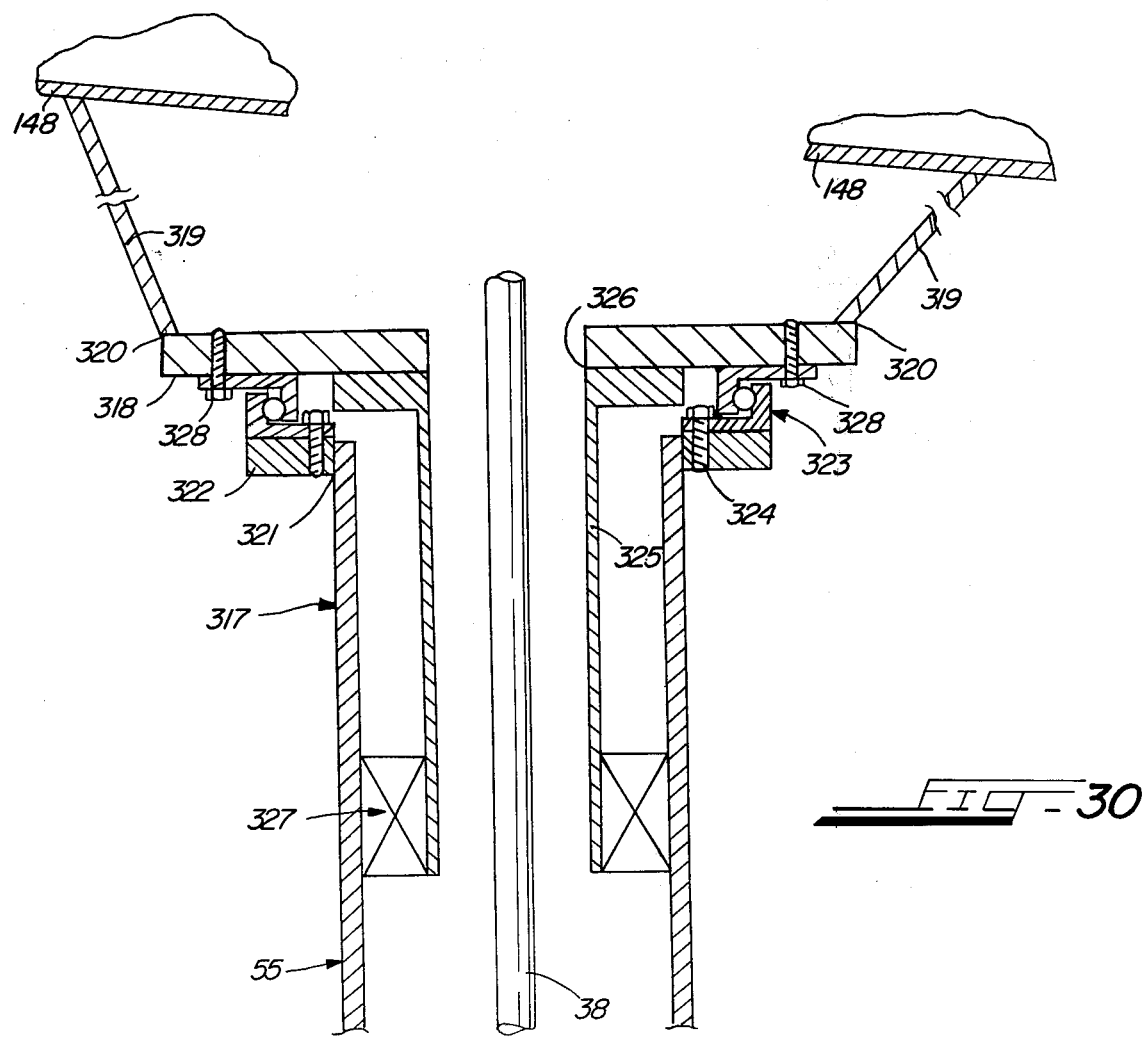

FIG. 5A is a top elevational view illustrating the tail or tail fin member moved from its normal position, in which it is shown in FIG. 5, into one of many positions which it may assume, due to the axial rotational or oscillating movement thereof about and relative to the horizontal axis of the tail-supporting shaft, namely, twisted at an angle of forty-five degrees (45°) from the position in which it is shown in FIG. 5;

FIG. 5B is a top plan view illustrating the tail or tail fin member moved from its normal position, shown in FIG. 5, into one limiting or extreme position it may assume due to axial rotation or oscillating movement about and relative to the horizontal axis of the tail-supporting shaft, namely, twisted at an angle of ninety degrees (90°) from the position in which it is shown in FIG. 5, or at a greater angle;

FIG. 6 is an enlarged vertical sectional view, on line 6—6 in FIG. 3, illustrating the construction of the combination pivotal mounting and manually controlled latch-operating means for pivotally interconnecting the rear or tail section, and the tail or tail fin member embodied therein, to the front or blade section;

FIG. 7 is a fragmentary plan view, partly in section, on line 7—7 in FIG. 6, illustrating the interconnecting means, in the form of a hinge member, for pivotally interconnecting the front or blade section and the rear or tail section of the new wind turbine and which interconnecting means forms a part of the manually controlled latching means for releasably latching together the rear or tail section and the front or blade section of the new wind turbine;

FIG. 8 is an enlarged partial elevational, partial sectional vertical view, on line 8—8 in FIG. 12, illustrating the hinge member and parts of the construction of the combination pivotal mounting and latch-operating means and parts of the latching means for releasably latching together the front or blade section and the rear or tail section and showing the parts in latched position;

FIG. 9 is an enlarged sectional view of the parts illustrated in FIG. 8 but showing the parts in unlatched position;

FIG. 10 is an enlarged fragmentary sectional view, on line 10—10 in FIG. 1, illustrating the construction of an adjustable counterweight device which is attached to the outer tubular shaft which is embodied in the rear or tail section of the new wind turbine for restraining the axial rotational or oscillating movement of the rear or tail section of the new wind turbine relative to the horizontal axis of the tail-supporting shaft;

FIG. 11 is a sectional view on line 11—11 in FIG. 6, illustrating parts of the construction of the rear or tail section of the new wind turbine;

FIG. 12 is a sectional plan view, on line 12—12 in FIG. 6, illustrating parts of the combination pivotal mounting means and manually controlled latch-operating means for releasably latching together the rear or tail section and the front or blade section or the new wind turbine;

FIG. 13 is a side elevational view illustrating parts of the front or blade section inclined at an acute angle of approximately six degrees (6°) upwardly from the horizontal, and relative to the rear or tail section 33, and also illustrating parts of the rear or tail section and parts of the manually controlled operating means for the brake mechanism which is embodied in the front or blade section of the new wind turbine including a flexible operating member which is manually accessible, by means of a hooked pole or rod, or the like, from the ground level on which the new wind turbine is mounted; and further illustrating parts of the manually controlled latch-operating means for the latching means which releasably latches the front or blade section and the rear or tail section together; and also illustrating parts of the manually controlled operating means for controlling the operation of the braking means for the blade-driven power shaft and the wind-driven blade members which drive the said blade-driven power shaft;

FIG. 14 is a fragmentary elevational view, partly in section, illustrating parts of the manually controlled latch-operating means for the latching means which releasably latches together the rear or tail section and the front or blade section; and illustrating parts of the manually controlled operating means for controlling the operation of the braking means for the blade-driven power shaft which is embodied in the new wind turbine; and also illustrating the guide means for the manually controlled operating means for the latching means and the braking means;

FIG. 15 is a sectional view, on line 15—15 in FIG. 13, illustrating parts of the construction of the manually operable brake mechanism which is embodied in the front or blade section of the new wind turbine for braking the rotation of the blade-driven power shaft and the wind-driven blade members which drive the power shaft;

FIG. 16 is a transverse or diametrical sectional view, on line 16—16 in FIG. 15, illustrating parts of the construction of the brake mechanism illustrated in FIG. 15 and the manually controlled operating means therefor;

FIG. 17 is a sectional view, partly in elevation, on line 17—17 in FIG. 1, illustrating the blade hub mounting assembly for mounting the wind-driven blade members on the blade-driven power shaft which is embodied in the front or blade section of the new wind turbine;

FIG. 18 is an enlarged sectional view, on line 18—18 in FIG. 17, illustrating part of the means for mounting the wind-driven blade members on the blade hub mounting assembly;

FIG. 19 is a plan view illustrating the means for mounting the wire cable reinforcing members on the wind-driven blade members which are embodied in the new wind turbine;

FIG. 19A is a view on line 19A—19A in FIG. 19, partly in elevation and partly in section;

FIG. 20 is a top plan view illustrating the front or blade section and the rear or tail section of the new wind turbine in their normal operating positions;

FIG. 21 is a top plan view illustrating the rear or tail section of the new wind turbine manually unlatched from the front or blade section and showing the rear or tail section turned on its pivotal mounting means through an arc of ninety degrees (90°) from its normal operating position, as in FIG. 20, but illustrating the front or blade section disposed in its normal operating position;

FIG. 22 is a top plan view illustrating the rear or tail section of the new wind turbine in its normal operating position but showing the front or blade section turned ninety degrees (90°) from its normal operating position, in which it is shown in FIGS. 20 and 21, so that in the event that a wind of unusually high velocity should develop in the area where the new wind turbine is located the force of the wind will strike the peripheral or marginal edge portions of blade membes and not the faces thereof and thus the front or blade section, and other parts of the new wind turbine, will not be torn apart or otherwise damaged by the force of a wind of unusually high velocity;

FIG. 23 is an elevational view of a spring tensioning device for restraining the oscillating or axial rotational movement of the tail or tail fin member and illustrating a manually operable tension-adjusting device for adjusting and varying the tension of the spring tensioning means on the tail or tail fin member to control the oscillating or axial rotational movement of the tail or tail fin member on the tail-supporting shaft and relative to the longitudinal axis of the tail-supporting shaft;

FIG. 24 is an enlarged fragmentary vertical sectional view, on line 24—24 in FIG. 3, illustrating parts of the front or blade section inclined at an acute angle of approximately six degrees (6°) upwardly from the horizontal, and from the rear or tail section 33, and also illustrating parts of the power transmission means for transmitting power from the front and horizontally extending blade-driven power shaft to the vertically extending power delivery shaft; and also illustrating a universal joint structure which is embodied in the power transmission system of the new wind turbine; and further illustrating the yaw bearing structure which is mounted in the supporting tower structure;

FIG. 25 is an elevational view of the spring tensioning means, shown in FIG. 23, for controlling the oscillating or limited axial rotational movement of the tail or tail fin member on and relative to the horizontal axis of the tail-supporting shaft, as illustrated in FIGS. 5A and 5B of the drawings, and also illustrating the manually operable tension-adjusting means for the spring tensioning means;

FIG. 26 is an enlarged sectional view illustrating the hub mounting assembly shown in FIGS. 17 and 18 of the drawings, for mounting the blade members on the front end portion of the blade-driven power shaft and also illustrating the housing and other parts of the braking mechanism for braking the rotation of the blade-driven power shaft and the blade members which drive the same, and also illustrating parts of the supporting strut structure for supporting certain of the wire cable reinforcing members for the wind-driven blade members;

FIG. 27 is a front elevational view, on line 27—27 in FIG. 3, illustrating the means for mounting certain of the wire cable-reinforcing means for the wind-driven blade members forwardly of the hub mounting assembly and illustrating the mounting of the steel supporting strut structure for supporting certain of the wire cable reinforcing members for the wind-driven blade members;

FIG. 28 is an elevational view, illustrating the means for mounting the tubular steel supporting struts for certain of the wire reinforcing cables for the wind-driven blade members and the means for mounting certain of the wire cable reinforcing members for the wind-driven blade members forwardly of the hub mounting assembly and the wind driven blade members;

FIG. 29 is a view, partly in section and partly in elevation, of a torque converter which is embodied in the proper transmission chain of the new wind turbine; and FIG. 30 is a sectional view of a yaw bearing structure which is embodied in the supporting tower structure of the new wind turbine, which is also shown in FIG. 24, and which supports the front or blade section and the rear or tail section on and above the supporting tower structure of the new wind turbine.

DESCRIPTION OF THE INVENTION ILLUSTRATED IN THE DRAWINGS

A preferred embodiment of the new wind turbine is illustrated in the drawings, wherein it is generally indicated at 30, and comprises a supporting frame or tower structure, generally indicated at 31, and which may be mounted at the ground level in a selected area, on concrete foundation 35, and on which are mounted a front or blade section, generally indicated at 32, and a rear or tail section, generally indicated at 33.

THE FRONT OR BLADE SECTION 32 AND THE MOUNTING OF THE WIND-DRIVEN BLADE MEMBERS 40 (FIGS. 1, 2, 3, 17, 18, 19, 20, 21, 22, 24 AND 26)

The front or blade section 32 of the new wind turbine is illustrated in FIGS. 1, 2, 3, 17, 18, 19, 20, 21, 22, 24 and 26 of the drawings and includes a mounting hub assembly 39 on which a plurality (shown as three) wind-driven blade members 40, of conventional design, are mounted in radially spaced relationship, shown as being 120°; the mounting of the wind-driven blade members 40 on the central mounting hub assembly 39 being accomplished by means shown in detail in FIGS. 17 and 18 of the drawings, and which will now be described.

Thus, by reference to FIGS. 17 and 18 of the drawings, it will be noted that the blade members 40 are interconnected by interconnecting means in the form of metal strap members 169, each of which has angled end portions 171 which are attached by fastening means, in the form of headed studs 170 which are threaded into tapped or screw-threaded openings 179 in the blade members 40 (FIG. 17).

As shown in FIGS. 17, 18 and 26 of the drawings, the hub mounting assembly 39 includes a generally annular metal hub plate member 172 on which radially spaced metal collar members 41 are integrally attached, as by welding, and each of the collar members 41 has an internally tapered opening 181 extending therethrough and through which a tapered fastening element in the form of a blade root member 141 extends and which has a threaded inner end portion 183 which is attached, by means of a threaded nut 183, to the metal collar member 41 which is attached to the annular hub plate member 172 (FIGS. 17 and 18). In addition, as shown in FIG. 17, each of the metal blade-interconnecting strap members 169 has an attaching lug 185 formed integrally therewith, and projecting radially inwardly therefrom, and each of these attaching lug members 185 is attached to the annular hub plate member 172 by a fastening means in the form of threaded bolts 168 (FIG. 17), thereby completing the mounting of the wind-driven blade members 40 on the annular hub plate member 172 of the hub mounting assembly 39.

The front or blade section 32 of the new wind turbine 30 includes a horizontally extending solid steel blade-driven power shaft 48 which extends into an outer tubular steel metal shaft 148 (FIGS. 13, 24 and 26), in which the inner end portion thereof is rotatably mounted in a bearing unit, as 158 (FIG. 24); the front end portion of the blade-driven power shaft 48 extending into and being attached to the centrally arranged hub mounting assembly 39.

As shown in FIG. 26, the front end portion of the tubular metal shaft 148 has a tapered front end portion 206 which extends into and is rotatably mounted in bearings 211, and the solid steel blade-driven power shaft 48 has a circular flange 207 formed thereon at its outer and front end. This flange 207 is attached by fastening elements, in the form of bolts 208, to a wall 209 of an anti-friction bearing housing 210 in which the anti-friction bearing units 211 are mounted, and in which the tapered front end portion 206 of the blade-driven power shaft 48 is rotatably mounted (FIG. 26). The bearing housing 210 has a circular flange 212 formed thereon which is attached by fastening elements, in the form of bolts 213, to the annular hub plate member 172 of the hub mounting assembly 39. The brake drum housing 232 includes an inclined front wall 231 having an annular depending attaching flange 214 which is also attached to the annular blade mounting hub member 172 by the bolts 213; the inclined front wall 231 extending downwardly and inwardly from the outer and cylindrical wall of the brake drum housing 232 (FIGS. 16 and 26).

THE REINFORCING MEANS 42 FOR THE BLADE MEMBERS 40 AND THE MOUNTING MEANS THEREFOR (FIGS. 1, 2, 19, 19A, 26, 27 AND 28)

The new wind driven turbine includes means for reinforcing the wind-driven blade members 40. Thus, as shown in FIGS. 1, 2, 26, 27 and 28 of the drawings, the blade members 40 are interconnected and reinforced by a generally triangular-spaced wire cable reinforcing unit 42 which includes a first set of circumferential wire cable reinforcing members 43 which are arranged in a generally triangular-shaped pattern between the blade members 40 and are attached to a metal mounting lug or plate 44 by a threaded stud 313 which is integrally attached, as by welding, to an end portion of each of the circumferential wire cable reinforcing members 43, and a nut 329 is attached to the threaded end portion of each of the studs 313 (FIGS. 19 and 19A). A second set of radial wire cable reinforcing members 45 extend generally parallel to the blade members 40 on the outer surfaces thereof and have frayed end portions 314 which are attached, as by welding, to the metal mounting plate member or lug 312 (FIGS. 19 and 19A). The metal mounting plate members or lugs 312 are attached to the blade members by fastening elements in the form of threaded studs 47.

Each of the radial wire cable reinforcing members 45 has an outer end portion 22 which is attached to a doubly threaded turnbuckle nut 224 which, in turn, is attached to a threaded anchor stud 223, the outer end portion of which is attached, as by welding, to a circular steel anchor plate member 220, as illustrated in FIGS. 27 and 28 of the drawings.

As shown in FIGS. 26, 27 and 28 of the drawings, the reinforcing means for the blade members 40 includes a supporting strut structure, which is generally indicated at 216, and includes a plurality, shown as three, tubular steel strut members 215 which are arranged in a generally triangular-shaped pattern (FIGS. 26, 27 and 28) with the apex of the pattern disposed at the front and outer end of the wind turbine 30 and with its base disposed at the hub mounting plate member 172 where each of the supporting strut members 215 is attached, as by welding, to a supporting bracket 217 which, in turn, is attached by fastening elements, in the form of bolts 218, to the hub mounting plate 172 at the front side thereof (FIG. 26).

At their front and outer ends each of the tubular steel struts 215 is attached, as by welding, at 230, to an annular steel strut anchor plate member 219 (FIG. 28) to which the steel anchor plate 220 for the steel studs 223 for the radial wire-reinforcing collar 45 are detachably attached, by fastening elements in the form of bolts 221, which extend through openings 226 and 227, respectively, in the anchor plate members 219 and 220 (FIG. 28). In this arrangement of the parts the steel anchor plate 220 and attached studs 223 and radial wire cable reinforcing members 45 may be detached from the strut anchor plate 219, when necessary, for replacement or repairs or for other purposes.

THE POWER TRANSMISSION MEANS FOR TRANSMITTING POWER FROM THE WIND-DRIVEN BLADE MEMBERS 40 AND THE POWER SHAFT 48 TO THE VERTICALLY EXTENDING POWER DELIVERY SHAFTS 38 AND 58 AND THE TORQUE CONVERTER 302 AND UNIVERSAL JOINT STRUCTURE 312 WHICH ARE EMBODIED IN THE POWER TRANSMISSION MEANS (FIGS. 1, 3, 24, 26 AND 29)

The new wind turbine 30 includes power transmission means for transmitting power from the wind-driven blade members 40, and the wind-driven power shaft 48, to the vertically extending power-delivery shaft 38 and the horizontally extending power delivery shaft 58. While such power transmission means may take various forms, one form thereof is illustrated in FIGS. 1, 24, 26 and 29 of the drawings, wherein it is generally indicated at 52, and comprises the horizontal blade driven power shaft 48 which is supported at its outer or blade end by the bearing housing 210 and at its inner end, or vertical power delivery shaft end, by the bearing unit 158 (FIGS. 24 and 26). The power shaft 48 has a bevel gear 151 mounted on the inner end portion thereof which meshes with a second bevel gear 152 which is mounted on the upper end portion 38A of the vertically extending power delivery shaft 38, which is rotatably mounted in bearing structures, as 155, which are arranged within the upper section 55 of the supporting tower structure 131 (FIG. 24).

The outer tubular shaft 148 has an access opening 156 formed therein, above the bevel gears 151 and 152, to provide access to the power transmission unit 52 for repair, replacement, oiling or the like, and this access opening 156 is normally closed by a closure plate member 153 which is attached to the outer tubular shaft 148, as by fastening elements 154—154.

It will thus be seen that when the wind-driven blade members 40 and the power shaft 48, are driven by the force of the wind striking the front faces of the blade members 40, power will be transmitted by the blade members 40, the central hub mounting assembly 39-172, the horizontal blade-driven power shaft 48, and the bevel gears 151-152, to the vertically extending power delivery shaft 38A-38 to rotate the latter and thus transmit power to the lower end portion of the power delivery shaft 38 and to the differential 60, the torque converter 59, and the horizontal power delivery shaft 58 to operate various devices and for various other purposes, as will be described more fully hereinafter. In addition, a conventional electric starter 61 and a conventional brake mechanism 62 are embodied in the power transmission system 57 (FIGS. 1 and 2).

THE FLUID TRANSMISSION TORQUE MULTIPLYING CONVERTER 59 (FIG. 29)

The new wind turbine 30 embodies a fluid transmission torque multiplying converter which is illustrated in FIG. 29, wherein it is generally indicated at 59, and which may be mounted at any point in the power transmission system or drive train, such as on the horizontal power shaft 48 or the vertical power delivery shaft 38 but is shown as mounted on the horizontal power delivery shaft 58, wherein it is shown as being arranged between a horizontal input power shaft 30, which leads from the differential 60 (FIG. 1), and the horizontal power delivery shaft 58. The torque converter 59 includes a metal housing 302 which is attached to the input power shaft 301 in any suitable manner, as by welding 310, or bolting; a fluid pump which includes vanes 303—303 which are attached to the housing 302 in any suitable manner, as by welding; and a fluid turbine which includes vanes 304—304 which are attached to the power output shaft 58 in any suitable manner, as by welding at 305. The torque converter 59 also includes a stator which embodies vanes 306—306 which are attached to a tubular supporting shaft 307 by means of an overrunning clutch mechanism 308, and a body of transmission fluid 309 is arranged in the housing 302.

Thus, when power is delivered to the power input shaft 301 it acts, through the housing 302, the transmission fluid 309, the turbine vanes 304—304, the overrunning clutch 308, the tubular supporting shaft 307, and the pump vanes 303—303 to rotate the power output shaft 58 in accordance with the power delivered to the power input shaft 301.

In the use of the new wind turbine 30 the torque converter 59 has the following advantages and provides the following desirable results:

1. It allows the blade members 40 to begin turning under essentially "no load" conditions;
2. It allows the blade members 40 to turn and come out of "stall" conditions in very low speed winds;
3. It multiplies the torque delivered by the blade members 40 and particularly at low rotational speeds;
4. It "smooths out" in the power delivery shaft 58 gusts of wind experienced by the blade members 40;
5. It protects the blade members 40 and the entire power drive train or transmission system, anterior or forwardly of the torque converter 50, from sudden "shock loads" applied to the power delivery shaft 58;
6. It loads the blade members 40 and prevents overspeeding by locking the power delivery shaft 58 and preventing it from turning;
7. It eliminates vibrations in the power delivery shaft 58; and
8. It enables the new wind turbine to heat fluid materials, such as water, by means of the heat generated in the transmission fluid 309 of the torque converter 59.

THE UNIVERSAL JOINT STRUCTURE 312 (FIG. 24)

As shown in FIG. 24, the new wind turbine 30 embodies a universal joint structure which is generally indicated at 312 and is mounted between the upper section 38A and the lower section of the vertical power delivery shaft 38 and below the front or blade section 32 and above a yaw bearing structure 317 (FIGS. 24 and 30) and which will be described hereinafter. The universal joint structure 312 embodies a conventional trunnion universal joint, and to this end includes a yoke member 313 which is attached in any suitable manner, as by splines or bolting to the upper section 38A of the power delivery shaft 38, and a yoke member 315 which is attached, as by splines or bolting to the lower section of the power delivery shaft 38. The upper yoke member 315 is attached to the lower yoke member 315 by a trunnion or four-arm cross 316 on the lower yoke member 315; two of the four arms of the trunnion or cross 316 work in the area 314 in the upper yoke member 313 and the other two arms of the trunnion or cross 316 work in the lower yoke member 315, as is well understood in the art.

In the use of the new wind turbine 30 the universal joint structure 312 serves the purpose of aligning the upper section 38A of the vertical power delivery shaft 38 perpendicularly or vertically relative to the ground level on which the new wind turbine 30 is mounted, in view of the six degree (6°) upwardly inclined acute angle at which the front or blade section 32 is mounted, relative to the horizontal and relative to the rear or tail section 33, as illustrated in FIGS. 13 and 24.

While the front or blade section 32 of the new turbine 30 is shown in FIGS. 13 and 24 as being inclined upwardly from its rear end to its front end, relative to the rear or tail section 33, at an angle of six degrees (6°), this is a preferred and optimum angle and the range of this angular inclination is in the order of from about four degrees (4°) to about ten degrees (10°). This angular inclination of the front section 32 relative to the rear or tail section 33, points the blade members 40 into more favorable winds, which is up, and this is particularly important when the blades 40 are at a relatively low level, such as 50 feet or lower, relative to the ground level and trees or other surrounding tall vegetation, or other tall objects. In addition, this angular inclination of the front or blade section 32, relative to the rear or tail section 33, helps to clear the tips of the blade members 40 away from the supporting tower structure 31-55 and to reduce the interference of wind from the back wash caused by the supporting tower structure 31-55.

THE YAW BEARING STRUCTURE 137 (FIGS. 24 AND 30)

The new wind turbine 30 also embodies a yaw bearing structure which is illustrated in FIGS. 24 and 30, wherein it is generally indicated at 317, and is disposed below the universal joint structure 314 (FIG. 24), and includes an annular steel supporting ring member 318 which is attached, by steel supporting struts 319, to the tubular metal housing 148 of the front or blade section 32, as by welding, and the steel supporting struts 319 are attached, as by welding 320, to the annular steel ring member 318 (FIG. 30).

The upper section 55 of the supporting tower structure 31 is welded, as at 321, to an annular steel ring 322 which supports a radial thrust bearing 323 which is fastened at its lower side to the annular steel ring 322 by fastening means in the form of bolts 324, and is fastened at its upper side by bolts 328 to the annular steel supporting ring 318.

A tubular bearing sleeve 325 is welded to the annular steel supporting ring 318, as at 326, and a radial yaw bearing 327 is mounted within the upper tubular section 55 of the supporting tower structure 31 and between the outer wall of the tubular supporting structure 55 and the outer wall of the bearing sleeve 325.

In the use of the new wind turbine 30, the yaw bearing structure 317 supports the front and rear sections 32 and 33 of the new wind turbine 30 on and above the supporting tower structure 31-55 and provides for orientation of the blade members 40 into the wind for power and out of the wind for safety. Thus, the bearing sleeve 325 and attached annular supporting ring member 318 and the front or blade section 32 are free to rotate on the yaw bearings 322 and 327, in a generally horizontal plane, relative to the supporting tower structure 55, under the force of the rear or tail structure 33, into the wind (operational) or out of the wind (non-operational) in a generally horizontal plane.

THE REAR OR TAIL SECTION 33 (FIGS. 1, 3, 4, 5, 6, 10, 11, 13, 20, 21, 22, 23 AND 25)

The rear or tail section 33 of the new wind turbine 30 is illustrated in FIGS. 1, 3, 4, 5, 6, 10, 11, 13, 20, 21, 22, 23 and 25 of the drawings, and includes a tubular inner steel tail-supporting shaft 50 and an outer tubular metal shaft 63 (FIG. 6) in which the inner tubular steel tail-supporting metal shaft 50 is mounted in suitable bearing structures, such as oil bearings 64 and 68 which are lubricated by oil from an oil reservoir 65 which is provided between the inner tail-supporting shaft 50 and the outer metal supporting housing 67 which is arranged within a generally rectangular-shaped outer tubular member 102 (FIGS. 6 and 11). The inner tail-supporting shaft 50 is welded to the outer tubular metal shaft 63, as at 314, and the inner tail-supporting shaft 50 and the tubular metal shaft 63 are rotatably mounted within the outer tubular member 67 (FIG. 6).

The inner tail-supporting shaft 50 has an externally threaded bolt 311 welded thereto, and internally thereof, and projecting outwardly therefrom at its inner end, and an internally threaded nut 312 is mounted thereon and is held in place by a cotter pin 313 (FIG. 6).

The inner tail-supporting shaft 50 has a tail or tail fin member 51 mounted on the rear end portion thereof, in any suitable manner and by any suitable fastening or mounting means, as by bolting, welding, or the like, as at 164 (FIG. 23). The tail or tail fin member 51 has a unique airfoil design which enables it to oscillate or have limited axial rotational movement on and relative to the horizontal axis of the tail-supporting shaft 50, as will be described further hereinafter. The tail or tail fin member 51 may be made of any suitable material such as plywood, aluminum, or other metal, molded plastic resinous material, or the like. A flexible manually operable cord or wire member 153 has its upper end portion attached to the lower marginal edge portion of the tail or tail fin member 51, and descends vertically therefrom to a point adjacent to but above the ground level on which the new wind turbine 30 is mounted (FIG. 1), and has a handle member 150 attached to the lower end portion thereof, and which is manually accessible by means of a hooked pole, rod or the like, for manipulating the tail or tail fin member 51 from the ground level, as will be described more fully hereinafter.

As shown in FIGS. 6 and 11, the outer rear tubular metal member 67 and the tail-supporting shaft 50 and the tubular metal shaft 63, are mounted within a generally rectangular-shaped housing 101 which has a pair of diametrically opposed vertically extending reinforcing T-beam members 157 attached thereto in any suitable manner, as by welding, or the like. Each of the reinforcing T-beam members 157 has a vertically extending fin 77 thereon and each of the reinforcing T-beam members 157 has an opening 158 formed therein for the passage of a combination pivotal mounting and latch-operating shaft member 74 (FIG. 6), which will be described more fully hereinafter.

THE RESILIENT MEANS FOR RESTRAINING AND LIMITING THE RATE OF YAW OR TURNING INTO THE WIND OF THE WIND TURBINE BLADE MEMBERS 40 BY THE LIMITED OSCILLATING ROTATIONAL MOVEMENT OF THE TAIL OR TAIL FIN MEMBER 51 (FIGS. 1, 4, 5, 13, 23 AND 25)

As shown in FIGS. 1, 4, 5, 23 and 25 of the drawings, the new wind turbine 30 includes resilient means for restraining and limiting the rate of yaw or turning into the wind of the new wind driven blade members 40 by means of a limited oscillating rotational movement of the tail or tail fin member 51 on and about the longitudinal axis "A" (FIG. 4) of the tail-supporting shaft 50. This resilient restraining means is generally indicated at 159 in FIGS. 13, 23 and 25 and includes an inclined restraining wire coil spring member 160 which is mounted on and surrounds a serpentine inclined wire cable restraining member 173 which has one end portion 199 thereof attached to an interconnecting member 175 (FIG. 25) and is inclined at an acute angle of approximately fifteen degrees (15°) downwardly from its front end to its rear end at the tail or tail fin member 51. The other end portion of the serpentine wire cable restaining member 173 is attached, as at 191, to one end portion of a tensioning device in the form of a manually operable turnbuckle device 177. One end portion 174 of the restraining coil spring 160 is, in turn, attached to a fastening element 165 which, in turn, is attached, as by welding to a supporting sleeve 162 which is fastened to the upper end portion of the combination pivotal mounting and latch-operating shaft member 74 by a screw 161; the lower end portion 176 of the restraining coil spring member 160 being attached to the turnbuckle device 177 by means of a fastening pin or element 179 to a rod member 192 which forms part of a turnbuckle spring tensioning device 177 (FIGS. 6, 23 and 25).

As shown in FIG. 25, the turnbuckle device 177 includes a manually operable turn screw 186 which is threadedly connected to the rod member 192, the other end portion of the turn screw 186 being threaded into an interconnecting handle member 193 to which one end portion of a second turn screw 188 is threadedly connected; the other end portion of the turn screw 188 being connected to an interconnecting member 178 which, in turn, is connected by a flexible wire member 163 to the tail or tail fin member 51, as at 164 (FIG. 23).

The restraining means 159 is such that the oscillating or limited axial rotational movement of the tail or tail fin member 51 on the horizontal axis "A" (FIG. 4) of the tail-supporting shaft 50, under the force of the wind, is restrained and limited by action of the tensioning coil spring 160, and the serpentine wire cable restraining member 173, in cooperation with the turnbuckle spring tensioning device 177, and the tension of the spring member 160 and the wire cable restraining member 173 may be adjusted by means of the turnbuckle spring tensioning device 177 (FIG. 25). Thus, the tension of the spring member 160 may be increased by manually rotating the handle member 193 of the turnbuckle device 177 in one direction or decreased by turning the handle member 193 of the turnbuckle device 177 in the opposite direction (FIG. 25). The tension of the coil spring 160 tends to return the tail or tail fin member 51 to its normal position, as in FIG. 4, when it has been moved by wind forces to oscillate or axially rotate about its axis "A" into a position such as one of the positions exemplified in FIGS. 5A and 5B of the drawings.

THE COUNTERWEIGHT DEVICE FOR DETERMINING THE RATE OF OSCILLATION OR AXIAL ROTATION OF THE TAIL MEMBER 51 ABOUT ITS AXIS "A" (FIGS. 1, 4 AND 10)

The new wind turbine 30 includes a counterweight device (FIGS. 1, 4 and 10) for determining the rate of oscillation or axial rotation of the tail fin member 51 about its axis "A" (FIG. 4). This counterweight device is illustrated in FIGS. 1, 4 and 10 of the drawings, wherein it is generally indicated at 102, and includes a tubular counterweight member supporting shaft or rod member 103 which has an externally threaded upper end portion 104 which is attached to an internally threaded annular metal attaching collar member 105 which, in turn, is attached, as at 106, to an annular collar 116 in any suitable manner, as by welding, and the annular collar 116 is attached to the outer wall of the outer rear tubular metal tail shaft 63 in any suitable manner, as by welding (FIG. 10).

The counterweight device 102 includes an adjustable counterweight member 108 which is attached, as at 109, as by welding, to an internally threaded annular collar member 110 which forms part of a counterweight adjusting means 107. The collar member 110 is threaded into an externally threaded lower end portion 111 of the counterweight supporting shaft or rod member 103 where it is retained between a threaded nut 112 on the threaded lower end portion 111 of the counterweight supporting shaft or rod member 103, at the upper side of the annular collar member 110, and a threaded nut 113 which is threaded onto the threaded lower end portion 111 of the counterweight supporting shaft or rod member 103 at the lower side of the threaded annular collar member 110 (FIG. 10).

It is thus apparent that the counterweight member 108 may be adjusted on the counterweight supporting rod or shaft member 103 by manipulating the adjusting means 107 on the threaded lower end portion of the counterweight supporting shaft or rod member 103 so as to vary the effective weight of the counterweight device 102 on the rear tail shaft assembly 67-63-50 and the tail or tail fin member 51, as shown in FIG. 10, and thereby restrain the oscillating movement of the rear or tail section 33 on the combination pivotal mounting and latch-operating shaft 74 in a horizontal plane and thus control the rate of oscillating or axial rotation of the tail member 51 about its axis "A" (FIG. 4).

THE COMBINATION PIVOTAL MOUNTING MEANS AND LATCHING MEANS FOR PIVOTALLY INTERCONNECTING THE FRONT OR BLADE SECTION 32 AND THE REAR OR TAIL SECTION 33 AND FOR RELEASABLY LATCHING TOGETHER THE REAR OR TAIL SECTION 33 AND THE FRONT OR BLADE SECTION 32 (FIGS. 1, 6, 7, 8, 9, 12 AND 24)

The new wind turbine includes a novel combination pivotal mounting means and latching means for pivotally interconnecting the front or blade section 32 and the rear or tail section 33 and for releasably latching together the front or blade section 32 and the rear or tail section 33, which is illustrated in FIGS. 1, 6, 7, 8, 9, 12 and 24 of the drawings, wherein it is generally indicated at 73, and which will now be described.

Thus, as shown in FIGS. 1, 6, 7, 8, 9, 12 and 24 of the drawings, the front or blade section 32 and the rear or tail section 33 are interconnected by an interconnecting means in the form of a steel or like metal hinge member 76 which may be formed, in part, as an integral part of the outer tubular shaft 148 of the front or blade section 32, as shown in FIGS. 6 and 24 of the drawings, and has a vertically extending opening 75 formed therein for the passage of the vertically extending combination solid steel or like metal pivotal mounting and latch-operating shaft member 74 which is slidably mounted in the opening 75.

In addition to being slidably and pivotally mounted in the vertically extending opening 75 in the hinge member 74, the combination pivotal mounting and latch-operating shaft member 74 is slidably mounted in a latch pin housing, which is generally indicated at 194 (FIGS. 8 and 9), and which is disposed below and is welded to the part 83 of the T-beam member 157 (FIGS. 8 and 9).

The latch pin housing 194 includes a tubular steel sleeve member 78 which has an upper end portion which is mounted in an opening 204 in the part 83 of the T-beam member 157 wherein it is welded to the part 83 of the T-beam member 157, as at 195 (FIGS. 8 and 9). The tubular sleeve member 78 supports annular bearings 196 and 168 which surround the shaft member 74. A pair of diametrically opposed tubular steel sleeve members 81 are attached, as by welding, to the tubular sleeve member 78, externally thereof, and the tubular steel sleeve members 81 are coaxially aligned with vertically extending and generally cylindrical latch pin holes or openings 82 which are provided in the hinge member 76 (FIGS. 7, 8 and 9) and which extend upwardly from the bottom of the hinge member 76 partially therethrough (FIGS. 7, 8 and 9).

A pair of solid rod latch pin members 80 are slidably mounted in the tubular latch pin sleeves 81 and each of the latch pin members 80 has a lower end portion 77 which is attached, as at 169, to a movable latch pin carriage 189 which is attached to and is movable on the pivotal mounting and latch operating shaft member 74, as will now be described.

To this end the latch pin carriage 189 includes two annular collars 197 which are attached, as by welding, to an annular member 190 which surrounds the lower end portion of the combination pivotal mounting and latch-operating shaft 74 (FIGS. 8 and 9). The annular member 190 has a depending lower end portion 84 which is threadedly connected, as at 85, to the upper end portion of a tubular handle shaft 86 in which a compression device, which includes a compression coil spring 91, is mounted on an adjustable rod member 88 which has an upper threaded end portion 89 which is threaded into a threaded opening 90 in the lower end portion of the pivotal mounting and latch-operating shaft member 74 (FIGS. 8 and 9).

An annular spring restraining member 92 is mounted within and is threadedly connected, as at 191, to the tubular member 84 and a compression-adjusting nut 192 is threaded onto a threaded lower end portion of the spring compression rod 198 (FIGS. 8 and 9).

As shown in FIGS. 7, four (4) spaced latching holes or openings 82A, 82B, 82C and 82D are provided in the interconnecting means or hinge member 76, wherein they are arranged in radially spaced relationship, around the combination pivotal mounting and latch-operating shaft member 74, and these latching holes or openings 82A, 82B, 82C and 82D extend approximately half way through the steel interconnecting hinge member 76 from the lower ends thereof (FIGS. 8 and 9).

As shown in FIGS. 1, 6, 13 and 14, the latch operating means 73 includes a flexible manually operable latch control cord or wire member 94, the upper end portion of which is attached, as at 95 (FIG. 6), to the lower end portion 96 of the tubular handle member 86, and the lower end portion of the flexible coil or wire member 94 has a handle member 97 attached thereto above, but is manually accessible by means of a hooked pole or rod, or the like, from the ground level on which the new wind turbine 30 is mounted (FIG. 1).

As shown in FIGS. 13 and 14, the manually operable flexible latch control cord or wire member 94 is guided through slots 98 which are formed in segmental guide tube members 99 which are spaced vertically along the length of the manually operable and flexible latch control wire or cord member 94.

In the use of the new wind turbine 30, as will be described more fully hereinafter, the latch pin members 80 are normally urged, by the coil spring compression device 87, into latched position, as in FIG. 8, with the upper end portions of the latch pin members 80 being engaged in the latching holes 82A and 82D in the interconnecting means or hinge member 76 (FIG. 7), and with the tail or tail fin member 51 disposed in its normal or axial position, as in FIGS. 1, 4, 5 and 20, and as in full lines in FIG. 3, and with the blade members 40 disposed in their normal operating position with their front faces facing the wind, as in FIGS. 1, 2, 3 and 20.

However, in the event that a wind of exceptional or unusually high velocity should strike the new wind turbine 30, and the blade members 40 and the tail or tail fin member 51, the operator or user of the new wind turbine 30 may, by means of a hooked pole or rod, or the like, grasp the handle member 97 at the lower end of the manually operable flexible latch control cord or wire 94 and pull downwardly thereon, thereby withdrawing the upper end portions of the latch pin members 80 from latching engagement in the latching holes 82A and 82D. The rear or tail section 33 and the tail or tail fin member 51 embodied therein may thus be manipulated by pulling downwardly on the handle member 150 which is attached to the lower end portion of the flexible latch control cord or wire 153, and manually rotating the tail or tail fin member 51, on its supporting shaft 50, from its normal latched position, as in FIGS. 1, 4, 5 and 20, and as in full lines in FIG. 3, through a partial revolution and arc of ninety degrees (90°), into the position in which the parts are shown in FIG. 21, with the tail or tail fin member 51 extending parallel to the plane of the blade members 40. At this time, the latch pin members 80 will come into registration with the latch pin holes 82B and 82C in the interconnecting means or hinge member 76, whereupon the spring compression device 87 will then urge the latch pin members 80 into latching engagement with the latching holes 82B and 82C.

The force of the wind against the face of the tail or tail fin member 51 will then rotate the front or blade section 32, and the rear or tail section 33, on the yaw bearing structure 317 (FIG. 30), into the position in which the parts are shown in FIG. 22, and in which the radially outer peripheral or marginal edges of the blade members 40 will extend generally parallel to the direction of the wind, as indicated by the arrows in FIG. 22. The tail or tail fin member 51 will then be returned by the force of the wind thereon, on the yaw bearing structure 317 (FIG. 30) to its normal position, as in FIG. 22, and with the body of the tail fin member 51 being disposed in a generally vertical plane and generally parallel to the direction of the wind, as in FIG. 22.

In this manner, the combination pivotal mounting and latch-operating shaft 74, and the latching means 73 associated therewith enable the new wind turbine 30 to be adjusted to a wind of unusually high velocity and prevent the front or blade section 32 and the rear or tail section 33 from being torn apart or seriously damaged by the force of a wind of unusually high velocity, as might otherwise occur.

It is to be noted that there is a space 166 between the rear end portion of the interconnecting means or hinge member 76 and the inner end portion of the inner tail-supporting shaft member 50 (FIG. 6) which enables the rear tail section 33 and the tail or tail fin member 51 embodied therein to be pivoted through an arc of ninety degrees (90°) in a horizontal plane relative to the front and blade section 32 while at the same time, enabling the rear inner tail-supporting shaft 50 and the tail or tail fin member 51 thereon, to axially rotate or oscillate relative to the longitudinal axis "A" of the inner tail-supporting shaft 50 under the force of the wind applied to the tail or tail fin member 51.

THE MANUALLY CONTROLLED BRAKE MECHANISM 114 FOR THE FRONT BLADE-SUPPORTING SHAFT 48 AND THE BLADE MEMBERS 40 SUPPORTED THEREBY (FIGS. 1, 13, 14, 15, 16 AND 26)

The new wind turbine 30 includes a manually operable brake mechanism for slowing or stopping the speed of rotation of the front and blade-driven power shaft 48 and the blade members 40 supported thereby. This brake mechanism is illustrated in FIGS. 1, 13, 14, 15, 16 and 26 of the drawings, wherein it is generally indicated at 114, and includes a generally cylindrical brake drum 232 which surrounds the tapered front end portion 206 of the outer tubular front shaft 148 (FIGS. 16 and 26).

As shown in FIG. 26, the front or outer wall 231-214 of the brake drum 232 is attached by bolts 213 to the hub mounting plate 173 and the hub mounting assembly 210 so that the brake drum 232 is rotatable with the hub mounting plate 172, and the power shaft 48, in the bearings 211.

A generally cylindrical segmental and expansion device 118 is mounted on the brake plate 115 and includes a pair of segmental expansion members 119 and 120 which are pivotally interconnected, as at 121. A suitable friction element or brake lining 117 is mounted on the segmental expansion members 119 and 120. A pair of operating expansion link members 122 and 123 are mounted on the brake plate 115 within the brake drum 232 and have their outer end portions pivotally connected, as at 124 and 125, respectively, to the segmental expansion members 119 and 120, with the link members 122 and 123 having their radially inner end portions pivotally interconnected, as at 126. A coil resetting spring 127 is mounted on the brake plate 115 within the brake drum 232 and has one end portion connected to the segmental expansion member 119, as at 128, and has its other end portion connected, as at 129, to the other segmental expansion member 120. An operating arm member 130 is pivotally connected to the link members 122 and 123, at their pivotal connection 126, and has an extension 131 in which an eyelet or opening 132 is provided for the reception of a hook-shaped arm 133 of a rocker arm member 134 which projects outwardly through a slot or opening 135 in a wall of the brake plate 115 (FIGS. 16 and 26). The outwardly projecting arm 137 of the rocker arm member 134 has a flexible brake-operating line, in the form of a flexible cord or wire 138, attached thereto, and which forms a part of a manually operable brake-operating means which includes a rocker arm member 139 which is pivotally mounted, as at 140, on the outer wall of the tubular front or blade section shaft 148 and includes an arm 136 to which the flexible brake-operating line 138 is attached, as at 142 (FIG. 13). The rocker arm member 139 also includes an arm 143 to which a second flexible brake-operating line, in the form of a flexible cord or wire 144, is attached, as at 145 (FIG. 13).

The second flexible brake-operating line 144 extends downwardly through the slots 146 in the tubular segmental guide members 99, parallel to the flexible manually operable latch control line 94, and has a handle member 147 attached thereto at its lower end, above the ground level, but which is manually accessible by means of a hooked pole or rod, or the like, from the ground level on which the supporting structure or tower 31 is mounted (FIGS. 13 and 14).

This arrangement of the manually operable flexible brake-operating line 144 and the flexible manually operable latch control line 94, and the line 144, and their downward extensions in parallel relationship, and through the openings 146 in the tubular segmental guide members 99, prevents the two flexible lines 94 and 144 from becoming entangled in use due to the action of the wind, or for other reasons.

In the use of the new wind turbine 30, when it is desired to slow or stop the rotation of the front and blade-driven power shaft 48, and the blade members 40 which drive the same, this may be accomplished by manually grasping the handle member 147 at the lower end of the flexible brake-operating line 144, by means of a hooked pole or rod, or the like, and pulling downwardly thereon, thereby causing the rocker arm member 139 to pivot, at 140 (clockwise, FIG. 13). This action causes the rocker arm member 139 to pull the flexible brake-operating line 138 to the right, as seen in FIGS. 13 and 16, thereby causing the rocker arm member 134 to pivot (clockwise, FIG. 16) and thus pivot the link members 122 and 123, at 126, in a direction (upwardly, as seen in FIG. 15), against the action of the resetting spring 127, and thereby forcing the friction bearing segmental brake-operating expansion members 119 and 120 radially outwardly into engagement with the brake drum 232, and thus slowing or stopping the rotation of the power shaft 48 and the blade members 40 which drive the same, after which the resetting spring 127 will return the parts to their initial and normal positions, as in FIGS. 15 and 16.

THE OSCILLATING TAIL STRUCTURE 33 (FIGS. 1, 3, 4, 5, 5A, 5B, 6, 13, 20, 21, 22 AND 23)

It will be noted that the tail or tail fin member 51 is mounted so as to oscillate or axially rotate about and relative to the horizontal axis "A" of the tail-supporting shaft 50 (FIG. 4). Such oscillation or rotating movement occurs when the moment of force produced by the force $F_1$ about the axis "A," is unequal to the moment of force produced by $F_2$ about the axis "A." The tail or tail fin member 51, and the rate of oscillation or axial rotation thereof, depends upon a number of factors including the densities of the material of which the tail or tail fin member 51 is made; the inequality of the areas above and below the longitudinal axis "A" of the tail-supporting shaft 50; the strength of the coil tensioning spring 160 in the spring tensioning device 159; the tension applied thereto by the turnbuckle tensioning device 177 (FIG. 25); and the effective weight of the counterweight device 102-108 (FIG. 10) to "absorb" or "even out" gusts of wind.

The oscillating tail or tail fin member responds to the flow of an upwind on the wind turbine 30 so that more rapid variations in direction of wind forces are damped, thereby reducing the stresses on the rotating blade members 40 as the reorientation of the blade direction or position of the blade members 40 is slowed.

It will be noted in this regard, that wind speed and pressure vary with the direction of flow of the wind, the distance of the blade members 40 from the ground, and with time. The airfoil nature of the tail or tail fin member 51 orientates the new wind turbine 30 into the wind, and the inequality of wind forces on the area above and below the longitudinal axis of revolution "A" of the tail-supporting shaft 50 (FIG. 4) allows the tail or tail fin member 51 to oscillate or axially rotate about and relative to the longitudinal axis "A" of the tail-supporting shaft 50. The tail or tail fin member 51 is shown in its normal position in FIG. 4 and in FIG. 5, and the axial rotation or oscillating motion of the tail or tail fin member is illustrated in FIGS. 5A and 5B as two of many different possible positions which the tail or tail fin member may assume.

The force on the tail or tail fin member 51 is due to the pressure of the wind, times the area of the tail or tail fin member 51, and the formula for this phenomenon is as follows:

Thus, force F is due to wind pressure P×area A of the tail 51, or $F_1 = P_1 A_1$ and $F_2 = P_2 A_2$ and when $F_2$ is greater than or less than $F_1$ the tail or tail fin member 51 will oscillate or axially rotate about and relative to the longitudinal axis "A" of the tail-supporting shaft 50, whereas the yaw of the wind turbine 30 is to due $F_1 + F_2$.

OPERATION

The parts of the new wind turbine 30 being assembled and mounted as shown in the drawings, and as described hereinbefore, the force of an inflowing wind will strike the front faces of the blade members 40, and thereby rotate the blade members 40 on the central hub mounting assembly 39-172 (FIG. 17) and thus rotate the blade-driven power shaft 48, and the hub mounting assembly 39-40 in the bearings 211 and 158 within the outer tubular shaft 148 (FIGS. 24 and 26). This rotation of the blade-driven power shaft 48 acts, through the power transmission unit 52, which includes the intermeshing bevel gears 151 and 152, to transmit power to the vertically extending power delivery shaft 38 and thence to the power delivery system 57, including power delivery shaft 58, and the torque converter 59, for any of the uses hereinbefore described, or for other uses.

In the event that the velocity of the wind striking the front faces of the blade members 40 becomes exceptionally, unusually or dangerously high, the manually controlled latch mechanism 73 may be operated, as hereinbefore described, by pulling downwardly simultaneously on the handle 97 and the attached flexible cord or wire 94, and on the flexible line 153 and its handle 150, so as to unlatch the latching device 73 and the combination pivotal mounting and latch-operating shaft member 74, from their normal latched position, as in FIG. 8, in which the latch pin members 80 are latchingly engaged in the latch holes 82A and 82D in the interconnecting means or hinge member 76, and then rotating the tail or tail fin member 51 on its supporting shaft 50, thereby rotating the latch pin members 80 and related parts from the latched position in which they are shown in FIG. 8 into the unlatched position in which they are shown in FIG. 9. During this operation, the rear tail section 33 and the tail or tail fin member 51 mounted thereon are manually rotated, by pulling on the handle 150 and the flexible line 153 on the combination pivotal mounting and latch-operating shaft 74, from their normal latched positions, as in FIGS. 1, 4 and 20, and as in full lines in FIG. 3, as hereinbefore described, through an arc or angle or ninety degrees (90°) into the position in which the parts are shown in FIG. 21, and in dotted lines in FIG. 3, with the axis of the tail or tail fin member 51 extending parallel to the plane of the blade members 40. At this time, upon manually releasing the handle 97 and the flexible cord or wire 94, the compression device 87 (FIGS. 8 and 9), will urge the latch pin members 80 into latching engagement with the latching holes 82B and 82C in the interconnecting means or hinge member 76. The force of the inflowing wind will thereupon engage the face or tail or tail fin member 51, positioned as in FIG. 21, and rotate or yaw the parts around the yaw bearing structure 317 (FIG. 30), into the position in which they are shown in FIG. 22, with the plane of the tail or tail fin member 51 extending generally vertically and parallel to the axes of the blade members 40, so that the inflowing wind will strike the peripheral or radially outer edges of the blade members 40, and not the front faces thereof, and thus prevent the force of the inflowing wind from tearing the assembly apart or seriously damaging it. Thereafter, the latching device 73 may be unlatched by manual operation of the handle 97 and attached flexible cord or line 94 and the tail or tail fin member 51 and the rear tail section 33, and the front or blade section 32, returned to their normal latched and operating position, as in FIGS. 1, 4 and 20, and as in full lines in FIG. 3, by manipulating the handle 150 and the flexible cord or line 153 to rotate the tail or tail fin member 51 about the combination pivotal mounting and latch-operating shaft 74.

In case it becomes necessary to slow or stop the rotational movement of the blade-driven power shaft 48, and the blade members 40 which drive the same, this may be accomplished, as described hereinbefore, by manually pulling downwardly on the handle 147 and attached brake-operating line 144 which acts, through the rocker arm 139 and attached brake-operating line 138, and rocker arm 134, and the linkage 122-123, to force the segmental brake expansion members 119 and 120 radially outwardly, against the action of the spring 127, into frictional engagement with the brake drum 232 by means of the friction member or brake lining 117, thereby slowing or stopping rotation of the blade-supporting shaft 48, the blade hub mounting assembly 39-172, and the blade members 40 mounted thereon.

As pointed out hereinbefore, one of the principal features and advantages of the present invention is the ability of the tail or tail fin member 51 to oscillate or axially rotate about and relative to the longitudinal axis "A" of the tail-supporting shaft 50, and this is accomplished, and rendered possible, as described hereinbefore, by reason of the novel mounting of the inner tail-supporting shaft 50 and the tubular shaft 63 within the outer tubular shaft 67, and within the housing 101, on the bearing units 64 and 68, so that when the wind strikes one side or face of the tail or tail fin member 51 with a certain degree of force, as described hereinbefore, the tail or tail fin member 51 will rotate or oscillate about and relative to the longitudinal axis "A" of the tail-supporting shaft 50 which will then have limited axial rotational movement on its bearings 64 and 68 within the outer tubular shaft 67 and the housing 101. This enables the tail or tail fin member 51 to axially rotate or oscillate under the force of a certain wind pressure applied thereto and thus accommodate the position of the tail or tail fin member 51 and the blades 40 to gusts of wind, and thereby preventing damage to or undue stress to the working parts of the new wind turbine 30, which might otherwise occur.

In the use of the new wind turbine 30 the universal joint structure 312 serves the purpose of aligning the vertical power delivery shaft 38 perpendicularly or vertically relative to the ground level on which the new wind turbine 30 is mounted, in view of the six degree (6°) upwardly inclined angle at which the front or blade section 32 is mounted, relative to the horizontally extending rear or tail section 33, as illustrated in FIGS. 13 and 24.

In the use of the new wind turbine 30, the yaw bearing structure 317 supports the front and rear sections 32 and 33 of the new wind turbine 30 on and above the supporting tower structure 55 and provides for orientation of the blade members 40 into the wind for power and out of the wind for safety. Thus, the bearing sleeve 325 and attached annular supporting ring member 318 and the front blade section 32 are free to rotate on the yaw bearings 323 and 327, in a generally horizontal plane, relative to the supporting tower structure 55, under the force of the rear or tail structure 33, into the wind (operational) or out of the wind (non-operational) and in a generally horizontal plane.

It will thus be seen from the foregoing description, considered in conjunction with the accompanying drawings, that the present invention provides a new and improved wind turbine having the desirable advantages and characteristics and accomplishing its intended objects, including those hereinbefore pointed out and others which are inherent in the invention.

I claim:

1. A wind turbine comprising:
 (a) a vertically extending supporting tower having
  (1) an upper end portion;
 (b) a vertically extending power delivery shaft mounted on the said vertically extending supporting tower structure;
 (c) a front and blade section including
  (1) a generally horizontally extending tubular supporting structure mounted on the said upper end portion of the said vertically extending supporting tower structure;
  (2) a supporting bearing hub mounting assembly mounted on the said horizontally extending tubular supporting structure;
  (3) a first and generally horizontally extending rotatable blade driven power shaft rotatably mounted within the said generally horizontally extending tubular supporting structure on the said hub mounting assembly and having a generally horizontally extending axis;
  (4) a plurality of radially arranged wind-driven blade members mounted on the said hub mounting assembly and operatively connected to the said blade driven power shaft;
  (5) means for coupling the said wind-driven blade members to the said first and generally horizontally extending rotatable blade-driven power shaft;
  (6) power transmission means for transmitting rotating motion of the said first and generally horizontally extending rotatable blade-driven power shaft, under the force of wind applied against the said blade members, to the said vertically extending power shaft;
 (d) a rear or tail section including
  (1) a second generally horizontally extending tubular supporting structure;
  (2) a second and generally horizontally extending tail-supporting shaft having a generally horizontally extending longitudinal axis and including
   a. a front end portion; and
   b. a rear end portion;
  (3) means for rotatably mounting the said second and tail-supporting shaft within the said second and generally horizontally extending tubular supporting structure;
  (4) a tail or tail fin member mounted on the said rear end portion of the said second and generally horizontally extending tail-supporting shaft and rotatable therewith;
 (e) means for interconnecting the said front and blade section and the rear and tail section in a generally parallel and coplanar relationship;
 (f) pivotal mounting means for pivotally mounting the said interconnecting means and the said front and blade section and the said rear and tail section for pivotal movement in a generally horizontal plane on the said pivotal mounting means for movement of the said rear or tail section out of the said generally parallel and coplanar position into a position at an angle of approximately ninety degrees (90°) relative to the said front or blade section; and
 (g) manually operable latching means coacting with the said interconnecting means and with the said pivotal mounting means for selectively latching the said rear or tail section in a normal position parallel to the longitudinal axis of the said first and blade-driven power shaft or in a position extending generally rightangularly relative to the longitudinal axis of the said first and blade-driven power shaft.

2. A wind turbine as defined in claim 1 in which
 (a) the said interconnecting means has
  (1) a vertically extending opening extending therethrough; and in which
 (b) the said pivotal mounting means includes
  (1) a vertically extending combination pivotal mounting and latch-operating shaft member extending through and slidably mounted in the said vertically extending opening in the said interconnecting means; and in which the said interconnecting means has
   a. a plurality of spaced latching holes formed therein; and in which
   b. the said latching means includes a plurality of latch members mounted on and movable with the said combination pivotal mounting and latch-operating shaft member and selectively engageable in the said latching holes;

c. resilient means normally urging the said combination pivotal mounting and latch-operating shaft member and the said latch members mounted thereon in a direction to urge the said latch members into latching engagement with the said latch holes in the said interconnecting means; and d. manually operable latch-operating means for moving the said combination pivotal mounting and latch-operating shaft member in a direction to move the said latch members out of latching engagement in the said latch holes.

3. A wind turbine as defined in claim 2 in which
(a) the said latch members are mounted on and are movable to a generally vertical plane with the said combination pivotal mounting and latch-operating shaft member; and in which
(b) the said manually operable latching means includes
(1) a manually operable flexible line member attached to and depending from the said combination pivotal mounting and latch-operating shaft member for moving the said combination pivotal mounting and latch-operating shaft member in a direction to move the said latch members, against the action of the said resilient means, out of latching engagement in the said latch holes in the said interconnecting means and thereby enable the said rear and tail section to be pivoted in a generally horizontal plane on the said combination pivotal mounting and latch operating shaft member and relative to the front or blade section.

4. A wind turbine as defined in claim 3 in which
(a) the said manually operable flexible line member extends downwardly and generally vertically below the said interconnecting means and has
(1) a lower end portion; and in which the said flexible line member has
(2) a handle member mounted on the said lower end portion thereof.

5. A wind turbine as defined in claim 4 which includes
(a) tubular guide members spaced vertically on the said manually operable flexible line member for guiding the said flexible line member during movement thereof.

6. A wind turbine as defined in claim 5 in which the said guide members are in the form of
(a) tubular guide members having therein
(1) vertically extending slots for the passage therethrough of the said manually operable flexible line member.

7. A wind turbine as defined in claim 3 which includes
(a) a manually operable flexible line member attached to and depending from the said tail or tail fin member and depending therebelow for pivotally rotating the said rear or tail section and the tail or tail fin member embodied therein in a generally horizontal plane on the said combination pivotal mounting and latch-operating shaft member when the said latch members are in latching engagement with certain of the said latching holes in the said interconnecting means.

8. A wind turbine as defined in claim 1 in which (a) the said tail-supporting shaft has
(1) a generally horizontal axis; and in which
(b) the said tail or tail fin member is free to axially rotate or oscillate on the said tail-supporting shaft about its said longitudinal axis independently of the said generally horizontally extending tubular supporting structure.

9. A wind turbine as defined in claim 8 which includes
(a) resilient means for restraining and limiting the axial rotation or oscillating movement of the said tail or tail fin member on the said tail-supporting shaft about and relative to its said longitudinal axis.

10. A wind turbine as defined in claim 7 in which the said combination pivotal mounting and latch-operating shaft member has
(a) an upper end portion extending above the said rear or tail section, and in which the said restraining means for restraining the axial rotation or oscillating movement of said tail or tail fin member on the said tail-supporting shaft and about and relative to its said longitudinal axis includes
(b) resilient spring restraining means including
(1) a rear end portion attached to the said tail or tail fin member;
(2) a front end portion attached to the said combination pivotal mounting and latch-operating shaft member; and the
(c) said resilient spring restraining means being inclined downwardly at an acute angle from its front end portion to its said rear end portion.

11. A wind turbine as defined in claim 1 in which the said second and generally horizontally extending tubular supporting structure of the said rear or tail section includes
(a) an outer rear tubular shaft member enclosing the said tail-supporting shaft; and in which the said wind turbine includes
(b) counterweight means mounted on and depending from the said outer rear tubular shaft member for restraining the pivotal movement of the said rear or tail section and the said tail member in a generally horizontal plane relative to the said front or blade section; and
(c) means for adjusting the said counterweight means on and relative to the said outer rear tubular shaft member so as to vary the effective weight thereof on the said second and generally horizontally extending tubular supporting structure.

12. A wind turbine as defined in claim 1 in which
(a) the said first and generally horizontally extending blade-driven power shaft includes
(1) a front end portion; and in which the said wind turbine includes
(b) a manually operable braking mechanism mounted at and surrounding the said front end portion of the said first and blade-driven power shaft rearwardly of the said blade members for braking the rotational movement of the said blade-driven power shaft and the blade members which drive the said power shaft.

13. A wind turbine as defined in claim 12 in which
(a) the said brake mechanism includes
(1) a generally cylindrical brake drum mounted on the said supporting bearing hub mounting assembly and attached to the said first and blade-driven power shaft;

(2) friction means mounted within the said generally cylindrical brake drum;

(3) resilient means normally urging the said friction means out of engagement with the said brake drum; and (b) manually operable means for moving the said friction means, against the action of the said resilient means, into frictional engagement with the said brake drum.

14. A wind turbine as defined in claim 13 in which the said manually operable means for moving the said friction means into frictional engagement with the said brake drum includes (a) a manually operable flexible brake-operating line member having a portion extending generally vertically downwardly below the said brake mechanism.

15. A wind turbine as defined in claim 14 in which the said manually operable flexible brake-operating line member includes (a) a lower end portion; and in which the said lower end portion of the said flexible brake-operating line member has (1) a handle member attached to the said lower end portion thereof.

16. A wind turbine as defined in claim 15 in which the said manually operable flexible brake-operating line member has (a) guide members spaced at intervals vertically thereon for guiding the said flexible brake-operating line member during movement thereof.

17. A wind turbine as defined in claim 16 in which (a) the said guide members are in the form of tubular members having formed therein (1) vertically extending slots for the passage of the said manually operable flexible brake-operating line member.

18. A wind turbine as defined in claim 2 in which (a) the said latching means includes (1) a plurality of tubular vertically extending sleeve members arranged radially and attached to the said combination pivotal mounting and latch-operating shaft member; and in which (b) the said latching means is in the form of a plurality of vertically extending latch pin members mounted in and attached to the said tubular sleeve members and movable therewith into and out of latching enagement with the said latch holes in the said interconnecting means.

19. A wind turbine as defined in claim 18 in which (a) the said interconnecting means has formed therein (1) an opening through which the said combination pivotal mounting and latch control shaft member is slidably mounted for movement in a vertical plane; and in which (b) the said combination pivotal mounting and latch-operating shaft member includes (1) a lower end portion; and in which the said wind turbine includes (c) a tubular member attached to and depending from the said lower end portion of the said combination pivotal mounting and latch-operating shaft member; and in which the said turbine includes (d) a compression rod member arranged within the said tubular member and having (1) a portion attached to the lower end portion of the said combination pivotal mounting shaft and latch-operating member, and having (2) a portion extending downwardly into the said tubular member; and in which the said wind turbine includes (e) resilient means mounted on the said compression rod member and urging the said combination pivotal mounting and latch-operating shaft member vertically upwardly relative to and through the said opening in the said interconnecting means and urging the said latch pin members mounted on the said combination pivotal mounting and latch-operating shaft member into latching engagement with the said latch holes in the said interconnecting means.

20. A wind turbine as defined in claim 19 in which (a) the said tubular member includes (1) a lower end portion; and in which the said wind turbine includes (b) a flexible manually operable latch control line member having (1) an upper end portion attached to the said lower end portion of the said tubular member; and having (2) a manually operable lower end portion depending below the said combination pivotal mounting and latch-operating shaft member for moving the said tubular member and the said combination pivotal mounting and latch-operating shaft member in a vertical plane so as to move the said latch pin members, against the action of the said resilient means, out of latching engagement with the said latching holes in the said interconnecting means.

21. A wind turbine as defined in claim 20 in which (a) the said latching holes in the said interconnecting means are arranged in a plurality of preselected patterns; and in which (b) the said latch pin members are movable into latching engagement with the latching holes in one of the said patterns when the said front and blade section and the said rear or tail section are disposed in a generally parallel and coplanar relationship, but in which (c) the said latch pin members are movable into latching engagement with another pattern of the said latching holes when the said rear or tail section is moved into a position at an angle of approximately ninety degrees (90°) relative to the said front and blade section.

22. A wind turbine comprising (a) a supporting means having mounted thereon (b) a first and front tubular supporting structure;

(c) a plurality of radially arranged wind-driven blade members;

(d) blade-supporting means within the said first and front tubular supporting structure for rotatably supporting the said wind-driven blade members;

(e) power transmission means cooperating with the said blade-supporting means for transmitting power generated by the said wind-driven blade members to a point of use;

(f) a second and rear tubular supporting structure normally arranged in a generally parallel and coplanar relationship with the said first and front tubular supporting structure;

(g) rotatable means within the said second and rear tubular supporting structure and having (1) a generally horizontal longitudinal axis;

(h) a tail or tail fin member mounted on the said rotatable means externally of the said second and rear tubular supporting structure and having
  (1) limited oscillating or axial rotational movement on the said rotatable means about and relative to the said longitudinal axis of the said rotatable means;
(i) interconnecting means for interconnecting the said first and front tubular supporting structure and the said second and rear tubular supporting structure;
(j) pivotal mounting means for pivotally mounting the said first and front tubular structure and the said second and rear tubular structure for pivotal movement relative to each other in a generally horizontal plane; and
(k) manually operable latching means coacting with the said interconnecting means for releasably latching the said first and front tubular supporting structure and the said second and rear tubular supporting structure together for pivotal movement relative to each other in a generally horizontal plane on the said pivotal mounting means.

23. A wind turbine as defined in claim 22 which includes
  (a) manually operable means for operating the said latching means.

24. A wind turbine as defined in claim 23 which includes
  (a) manually operable means for pivoting the said second and rear supporting structure and the said tail or tail fin member thereon on the said pivotal mounting means in a generally horizontal plane relative to the said first and front tubular supporting structure and the said wind-driven blade members supported thereby.

25. A wind turbine as defined in claim 22 which includes
  (a) means coacting with the said pivotal mounting means for restraining the oscillating or axial rotational movement of the said tail or tail fin member on the said rotatable means.

26. A wind turbine as defined in claim 22 which includes
  (a) braking means for slowing or stopping the rotation of the said blade-supporting means and the said wind-driven blade members supported thereby; and
  (b) manually operable means for operating the said braking means.

27. A wind turbine as defined in claim 22 which includes
  (a) means for unlatching the said front tubular supporting structure and the said wind-driven blade members supported thereby and the said second and rear tubular supporting structure and the said tail or tail fin member supported thereby from latching engagement with each other for movement into coplanar but angular reationships relative to each other.

28. A wind turbine as defined in claim 9 which includes
  (a) manually operable means for tensioning the said resilient means for restraining and limiting the axial rotational or oscillating movement of the said tail or tail fin member.

29. A wind turbine comprising
  (a) a supporting structure;
  (b) power transmission means mounted on the said supporting structure and including
    (1) blade-driven power shaft means rotatably mounted on the said supporting structure;
    (2) power delivery shaft means rotatably mounted on the said supporting structure;
  (c) means for operatively interconnecting the said blade-driven power shaft means and the said power delivery shaft means;
  (d) a plurality of radially arranged wind-driven blade members;
  (e) means for rotatably mounting the said wind-driven blade members to the said wind-driven power shaft means;
  (f) a second and generally horizontally extending tail-supporting shaft having
    (1) a rear end portion; and having
    (2) a horizontally extending longitudinal axis;
  (g) a tail or tail fin member mounted on the said tail-supporting shaft; and
  (h) means for rotatably mounting the said second and tail-supporting shaft on the said supporting structure for axial rotational or oscillating rotational movement of the said second and generally horizontal tail-supporting shaft and the said tail or tail fin member mounted thereon about and relative to the said longitudinal axis of the said tail-supporting shaft and independently of the said rotational movement of the said first and generally horizontally extending power shaft and the said wind-driven blade members which drive the said power shaft;
  (i) fluid transmission torque-multiplying means in the said power transmission means; and
  (j) means for mounting the said fluid transmission torque-multiplying means in the said power transmission means.

30. A wind turbine as defined in claim 29 in which the said power transmission means includes
  (a) a generally horizontally extending blade-driven power shaft; and
  (b) power delivery shaft means disposed below the said generally horizontally extending blade-driven power shaft;
  (c) means for operatively interconnecting the said blade-driven power shaft and the said power delivery shaft means; and in which the said fluid transmission torque-multiplying means is arranged in the said power delivery shaft means.

31. A wind turbine as defined in claim 29 in which each of the said wind driven blade members has
  (a) an outer or front face; and in which the said means for reinforcing the said wind-driven blade members includes
  (b) a plurality of radial wire cable reinforcing members extending generally parallel to each of the said wind driven blade members at the said outer or front face thereof; and in which each of the said radial wire cable reinforcing members has
    (1) a radially outer end portion and a radially inner end portion; and in which each of said radial wire cable reinforcing members has its said radially outer end portion attached to one of the said wind-driven blade members on the said outer or front face thereof; and in which each of the said radial wire cable reinforcing members has
    (2) its said radially inner end portion attached to the said means for mounting the said wind-driven blade members on the said first and generally horizontal extending blade-supporting power shaft.

32. A wind turbine as defined in claim 31 which includes
(a) circumferential wire cable reinforcing members each having
(1) one end portion thereof attached to one of the said wind-driven blade members; and each having
(2) a second portion disposed circumferentially relative to another of the said wind-driven blade members.

33. A wind turbine as defined in claim 31 which includes
(a) circumferential wire cable reinforcing members each having
(1) a rear end portion thereof attached to one of the said wind-driven blade members; and each having
(2) an outer and front end portion disposed forwardly of the said means for mounting the said wind driven blade members on the said generally horizontally extending blade driven power shaft; and
(b) additional mounting means for mounting the said outer and front end portions of the said circumferential wire cable reinforcing members forwardly on the said wind-driven blade members.

34. A wind turbine as defined in claim 31 in which
(a) the said means for mounting the said wind-driven blade members to the said generally horizontally extending power shaft is in the form of
(b) a hub mounting assembly attached to the said generally horizontally extending power shaft and having the said wind-driven blade members attached thereto; and in which the said means cooperating with the said additional mounting means includes
(c) an anchor plate unit disposed forwardly of the said hub mounting assembly and forwardly of the said wind driven blade members;
(d) a plurality of supporting strut members each having
(1) an inner or rear end portion attached to the said hub mounting assembly; and each having
(2) an outer or front end portion attached to the said anchor plate unit; and
(e) means for attaching the said radial wire cable reinforcing members to the said anchor plate unit.

35. A wind turbine as defined in claim 34 in which
(a) the said anchor plate unit includes
(1) a first and inner anchor plate member having the said supporting strut members attached thereto;
(2) a second and outer anchor plate member disposed forwardly and outwardly of the said first anchor plate member;
(b) means for detachably attaching the said first and second anchor plate members together; and
(c) means for attaching the said radial wire cable reinforcing members to the said second and outer anchor plate member.

36. A wind turbine as defined in claim 34 in which
(a) the said supporting strut members are arranged in a generally triangular-shaped pattern having
(1) an apex and front and outer end disposed adjacent the said anchor plate unit; and
(2) having a base and inner or rear end disposed adjacent the said hub mounting assembly.

37. A wind turbine comprising
(a) a generally vertically extending supporting structure;
(b) a rear or tail section mounted on the said supporting structure and extending generally horizontally relative to the said generally vertically extending supporting structure and including
(1) a tail or tail fin member mounted on the said rear or tail section;
(c) a front or blade section having
(1) a rear end portion disposed adjacent the said rear or tail section; and having
(2) a front end portion;
(d) the said front or blade section extending at a low acute angle upwardly from its said rear end portion adjacent the said rear or tail section to its said front end portion;
(e) means for operatively interconnecting the said rear or tail section and the said front or blade section;
(1) pivotal mounting means for pivotally mounting the said interconnecting means and the said front or blade section and the said rear or tail section for pivotal movement in a generally horizontal plane on the said pivotal mounting means for independent movement of the said rear or tail section relative to the said front or blade section; and
(2) manually operable latching means coacting with the said interconnecting means and with the said pivotal mounting means for selectively latching the said rear or tail section in a position generally parallel and coplanar relative to said front or blade section or in a position extending generally rightangularly relative to said front of blade section;
(f) power transmission means mounted on the said generally vertically extending supporting structure and including
(1) generally horizontally extending blade-driven power shaft means mounted on the said generally vertically extending supporting structure;
(2) generally vertically extending power delivery shaft means rotatably mounted on the said generally vertically extending supporting structure;
(3) means operatively interconnecting the blade-driven power shaft means and the said generally vertically extending power delivery shaft means;
(g) means for rotatably mounting the said front or blade section on the said generally vertically extending supporting structure; and
(h) a universal joint structure in the said vertically extending power delivery shaft means and serving to maintain the said angularly upwardly extending front or blade section in a generally rightangular or perpendicular relationship relative to the said generally horizontally extending rear or tail section.

38. A wind turbine as defined in claim 37 in which the said lower acute angle at which the said front or blade section is inclined upwardly from and relative to the said generally horizontally extending rear or tail section is in the order of from four degrees (4°) to ten degrees (10°).

* * * * *